US008922903B2

(12) United States Patent
Nagahara et al.

(10) Patent No.: US 8,922,903 B2
(45) Date of Patent: Dec. 30, 2014

(54) PROJECTION ZOOM LENS AND PROJECTION TYPE DISPLAY DEVICE

(71) Applicant: FUJIFILM Corporation, Tokyo (JP)

(72) Inventors: Akiko Nagahara, Saitama-ken (JP); Masaru Amano, Saitama-ken (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 14/258,321

(22) Filed: Apr. 22, 2014

(65) Prior Publication Data

US 2014/0226218 A1  Aug. 14, 2014

Related U.S. Application Data

(63) Continuation of application No. PCT/JP2012/006588, filed on Oct. 15, 2012.

(30) Foreign Application Priority Data

Oct. 26, 2011   (JP) ................. 2011-234550

(51) Int. Cl.
   *G02B 15/177*   (2006.01)
   *H04N 5/225*    (2006.01)
   *G02B 13/00*    (2006.01)

(52) U.S. Cl.
   CPC ........... *G02B 15/177* (2013.01); *G02B 13/009* (2013.01)
   USPC ......................................... 359/682; 348/345

(58) Field of Classification Search
   CPC ...... G02B 15/04; G02B 15/177; G02B 13/04; G02B 13/009
   USPC ........... 348/345; 359/676, 679, 680, 681, 682
   See application file for complete search history.

(56) References Cited

U.S. PATENT DOCUMENTS

| 7,715,111 B2 | 5/2010 | Yamamoto et al. |
| 8,373,933 B2 | 2/2013 | Eguchi |
| 8,699,152 B2 * | 4/2014 | Amano ................. 359/761 |
| 2008/0304162 A1 | 12/2008 | Yamasaki |
| 2009/0323197 A1 | 12/2009 | Masui |
| 2013/0314675 A1 * | 11/2013 | Amano ................. 353/69 |
| 2014/0226219 A1 * | 8/2014 | Baba et al. ........... 359/680 |

FOREIGN PATENT DOCUMENTS

| JP | 2005-084455 | 3/2005 |
| JP | 2008-275713 | 11/2008 |
| JP | 2008-304765 | 12/2008 |
| JP | 2009-210594 | 9/2009 |
| JP | 2010-008797 | 1/2010 |
| JP | 2010-156762 | 7/2010 |

OTHER PUBLICATIONS

International Search Report, PCT/JP2012/006588, Jan. 15, 2013.

* cited by examiner

*Primary Examiner* — David N Spector
(74) *Attorney, Agent, or Firm* — Young & Thompson

(57) ABSTRACT

A projection zoom lens has a negative first lens group which is fixed when changing magnification, second through fifth lens groups that move when changing magnification, and a positive sixth lens group which is fixed when changing magnification, in this order from a magnification side. The reduction side is telecentric. When changing magnification from a wide angle end to a telephoto end, the second lens group moves toward the magnification side. The first and second lenses from the reduction side of the fifth lens group are a positive lens and a negative lens, respectively. The sixth lens group is constituted by a single positive lens. The projection zoom lens satisfies a predetermined Conditional Formula.

19 Claims, 24 Drawing Sheets

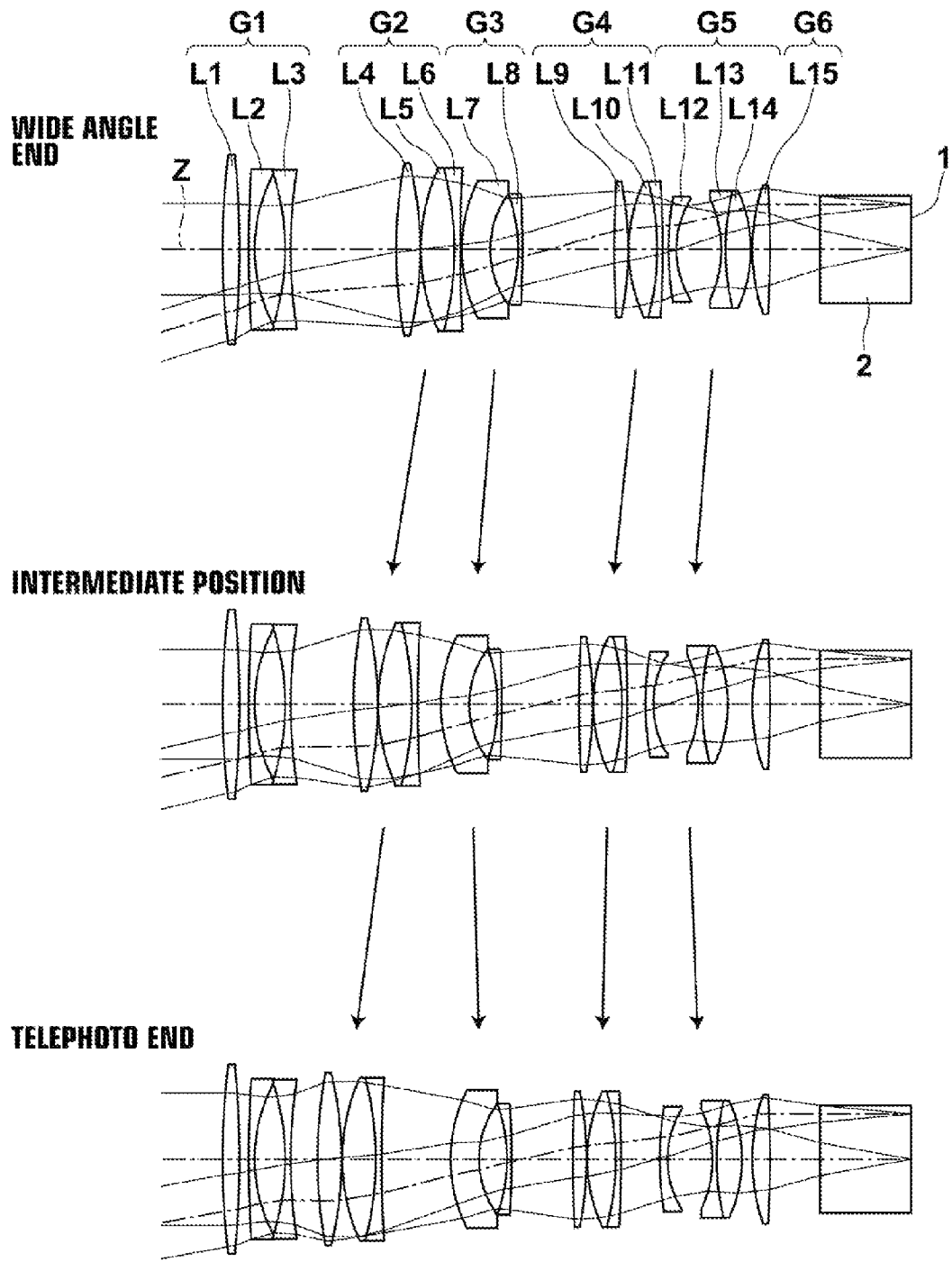

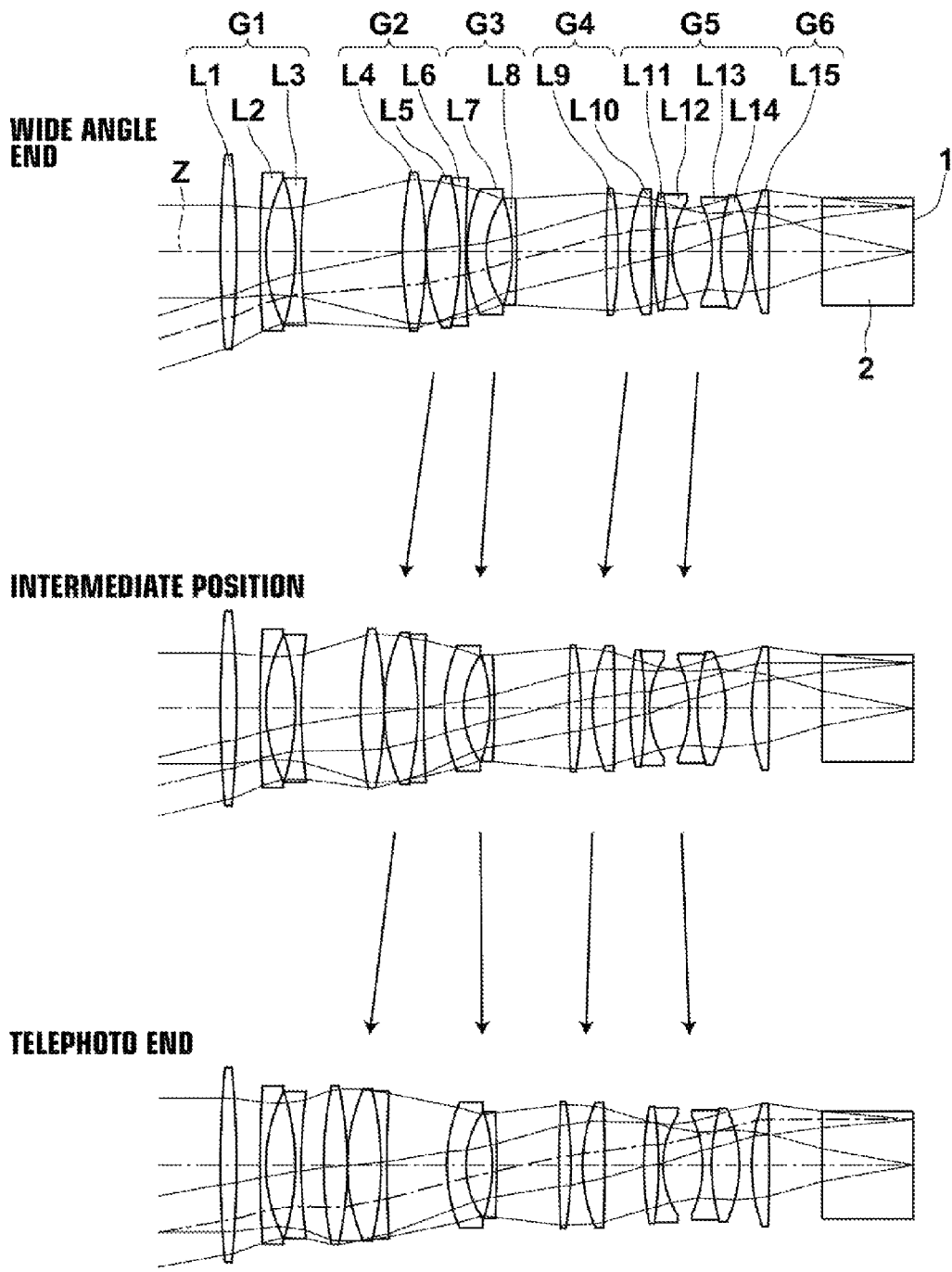

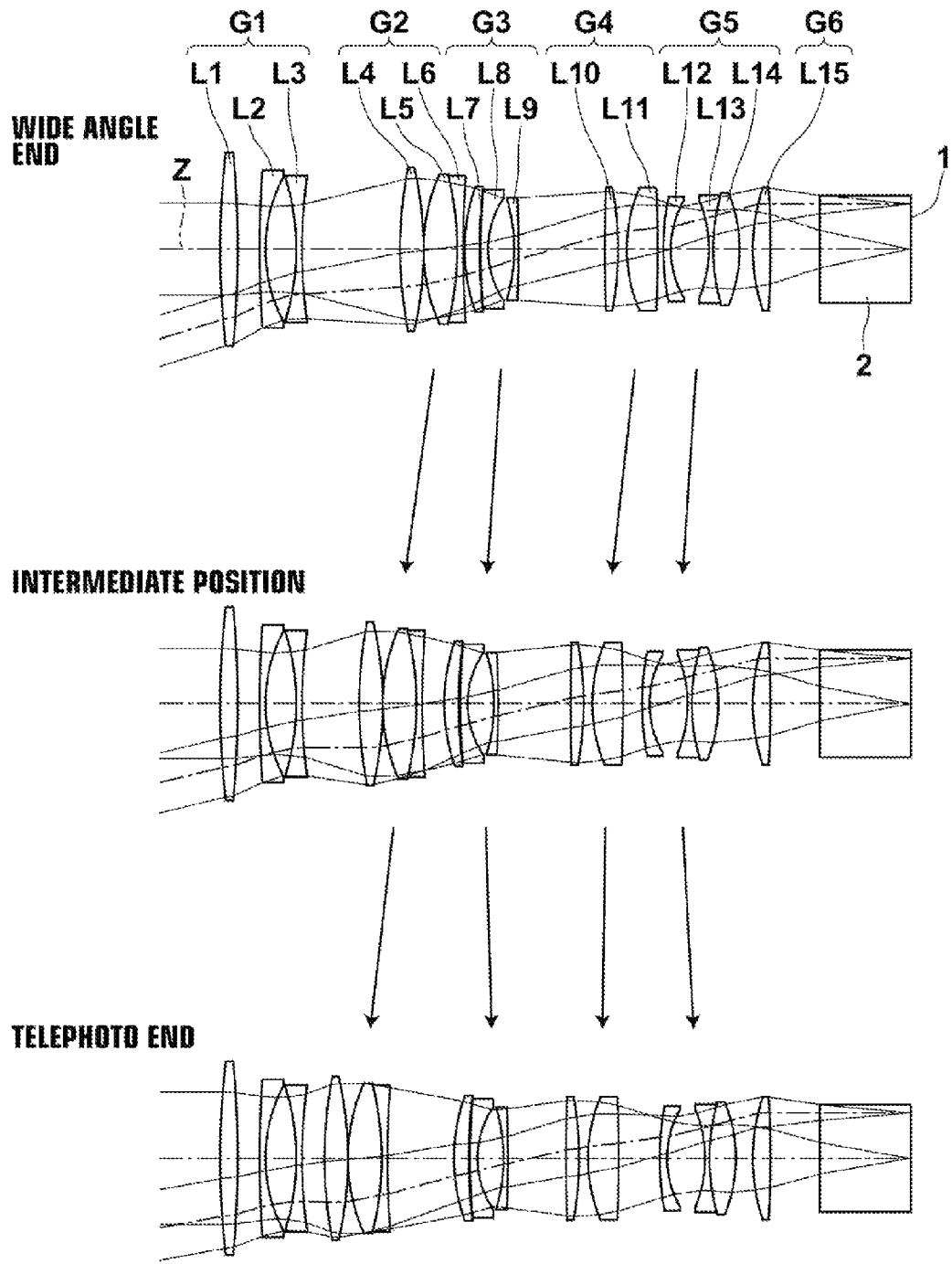

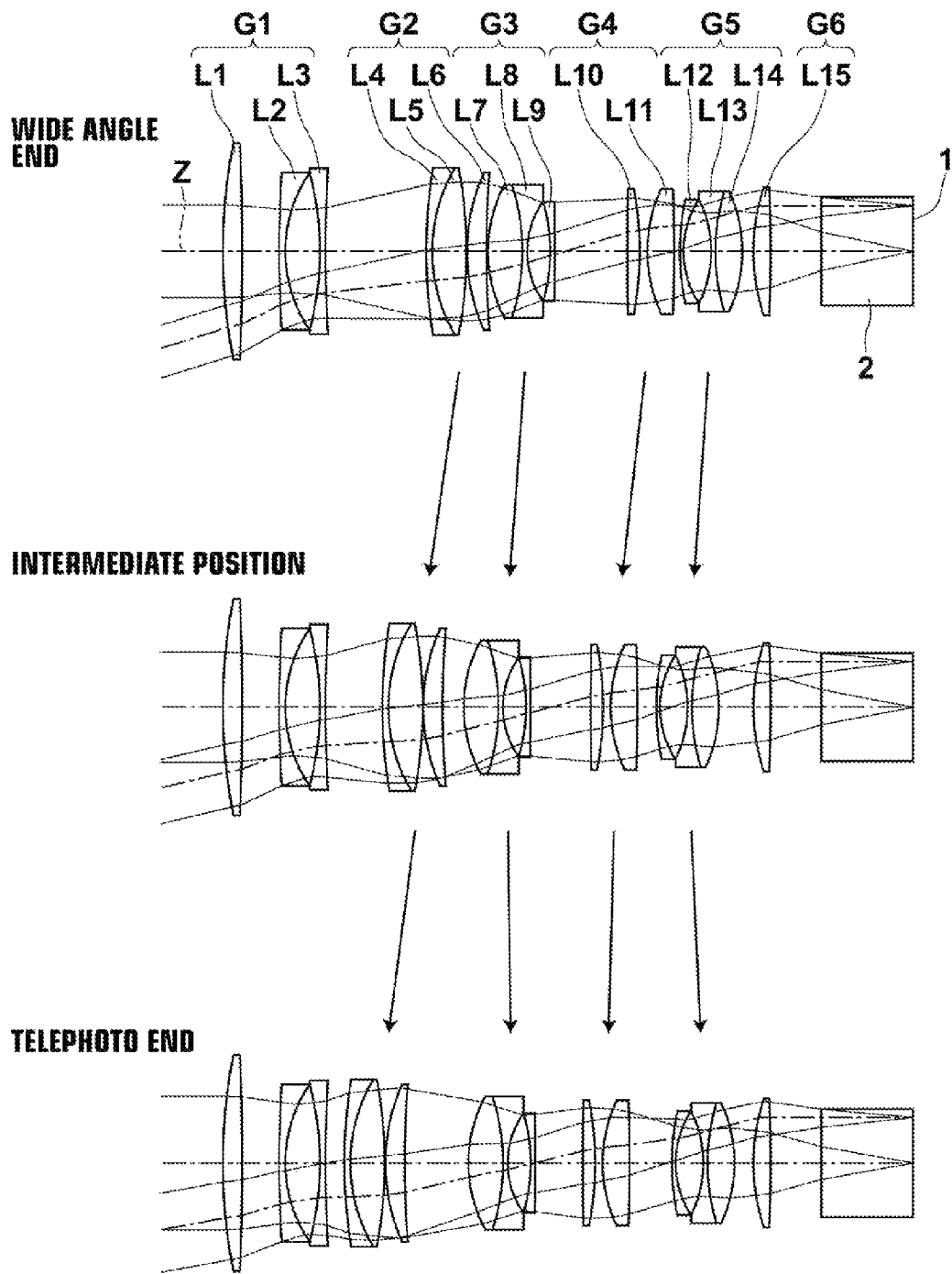

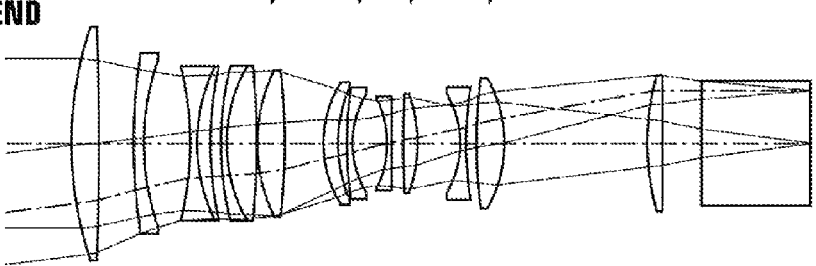

FIG.6　EXAMPLE 6
← MAGNIFICATION SIDE　　　REDUCTION SIDE →
WIDE ANGLE END
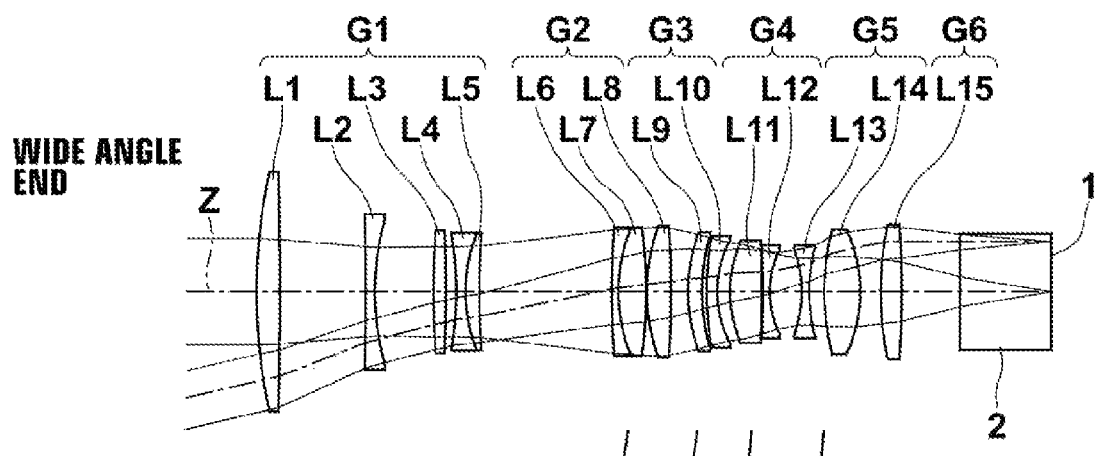
INTERMEDIATE POSITION
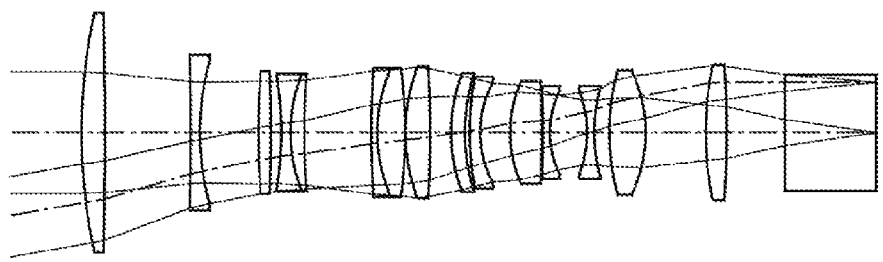
TELEPHOTO END
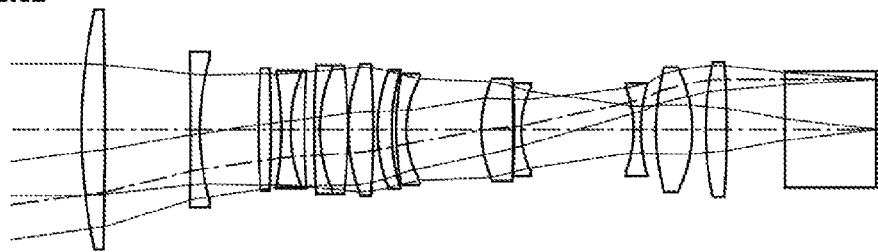

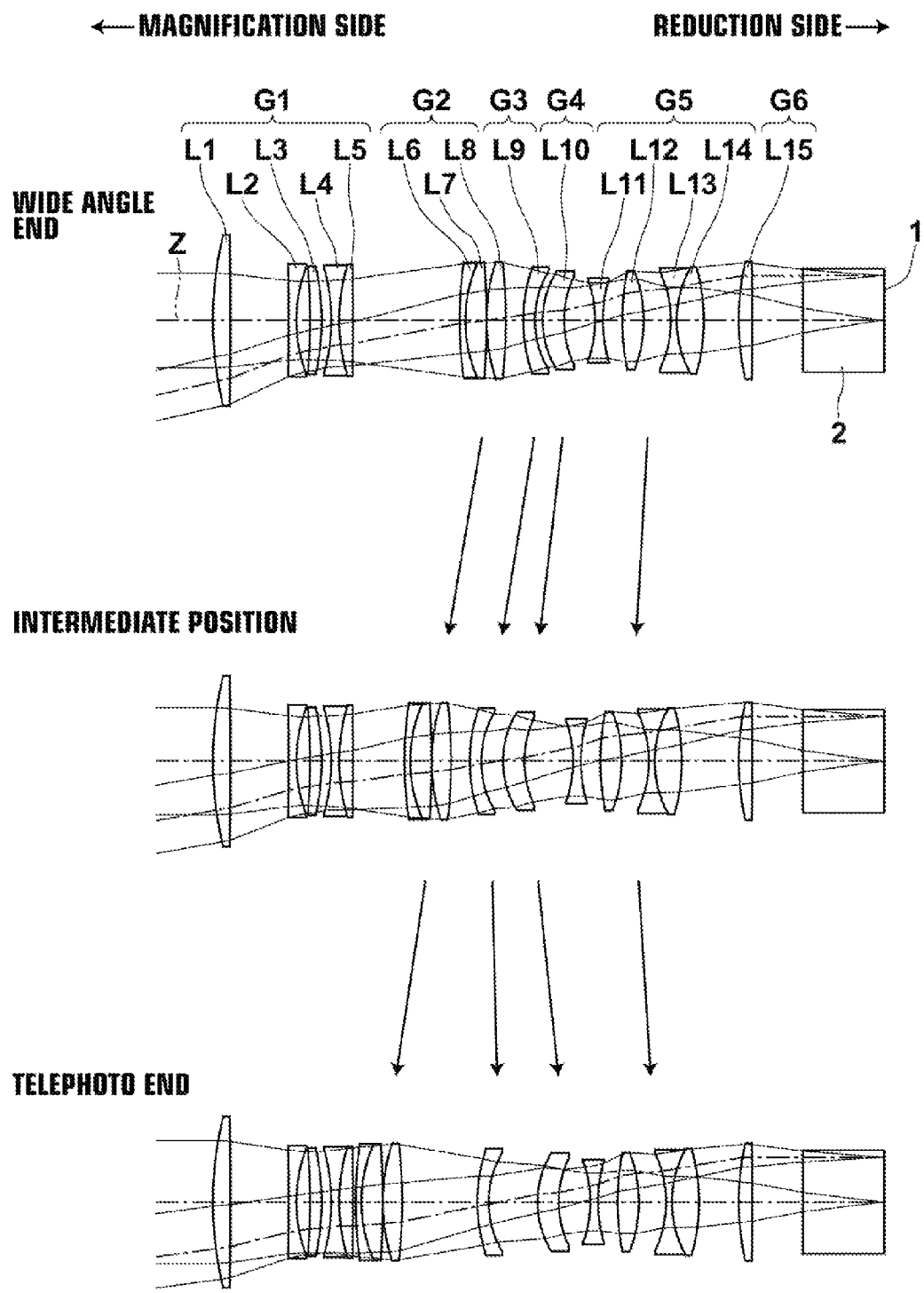
FIG.7 EXAMPLE 7

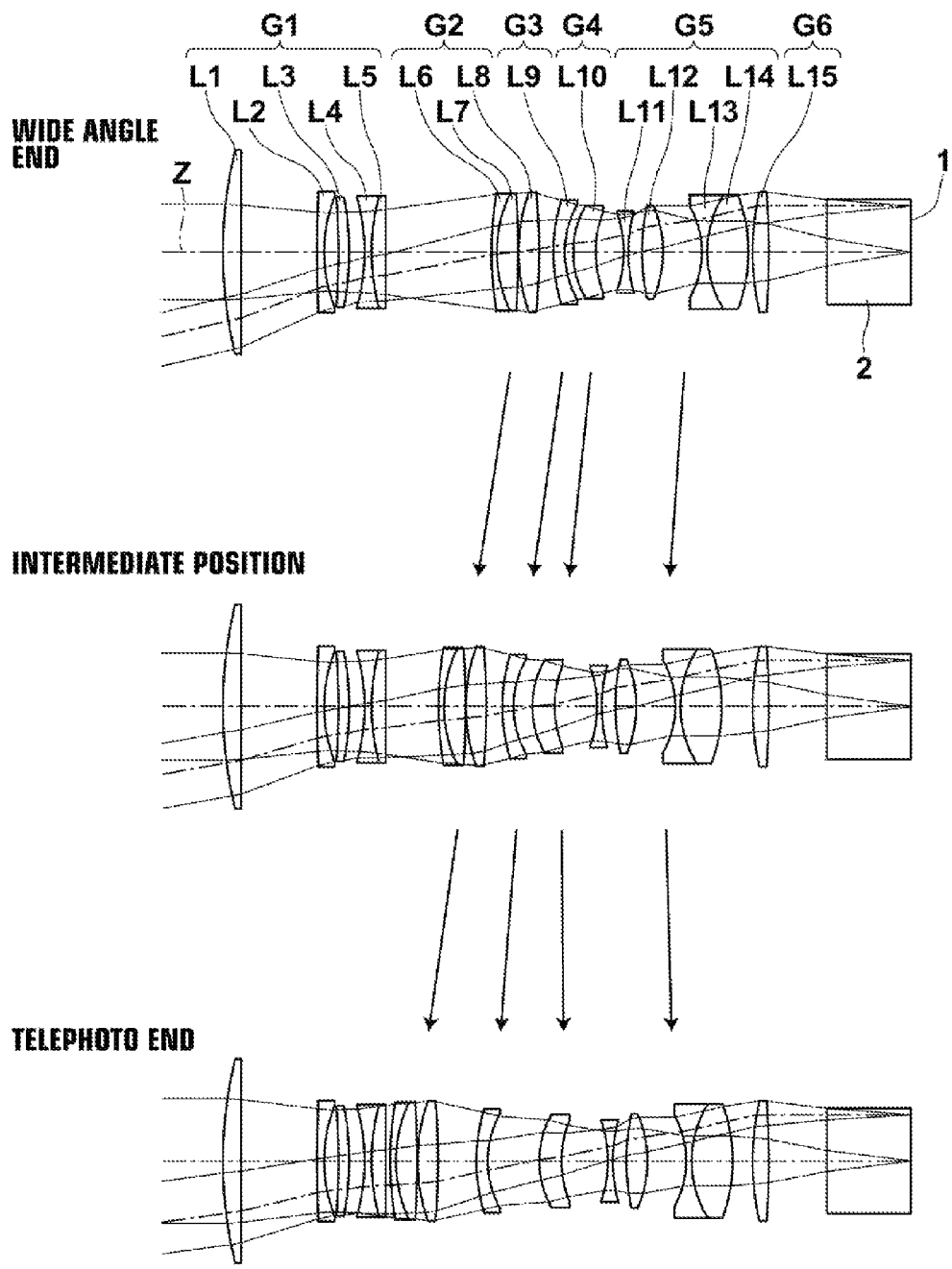

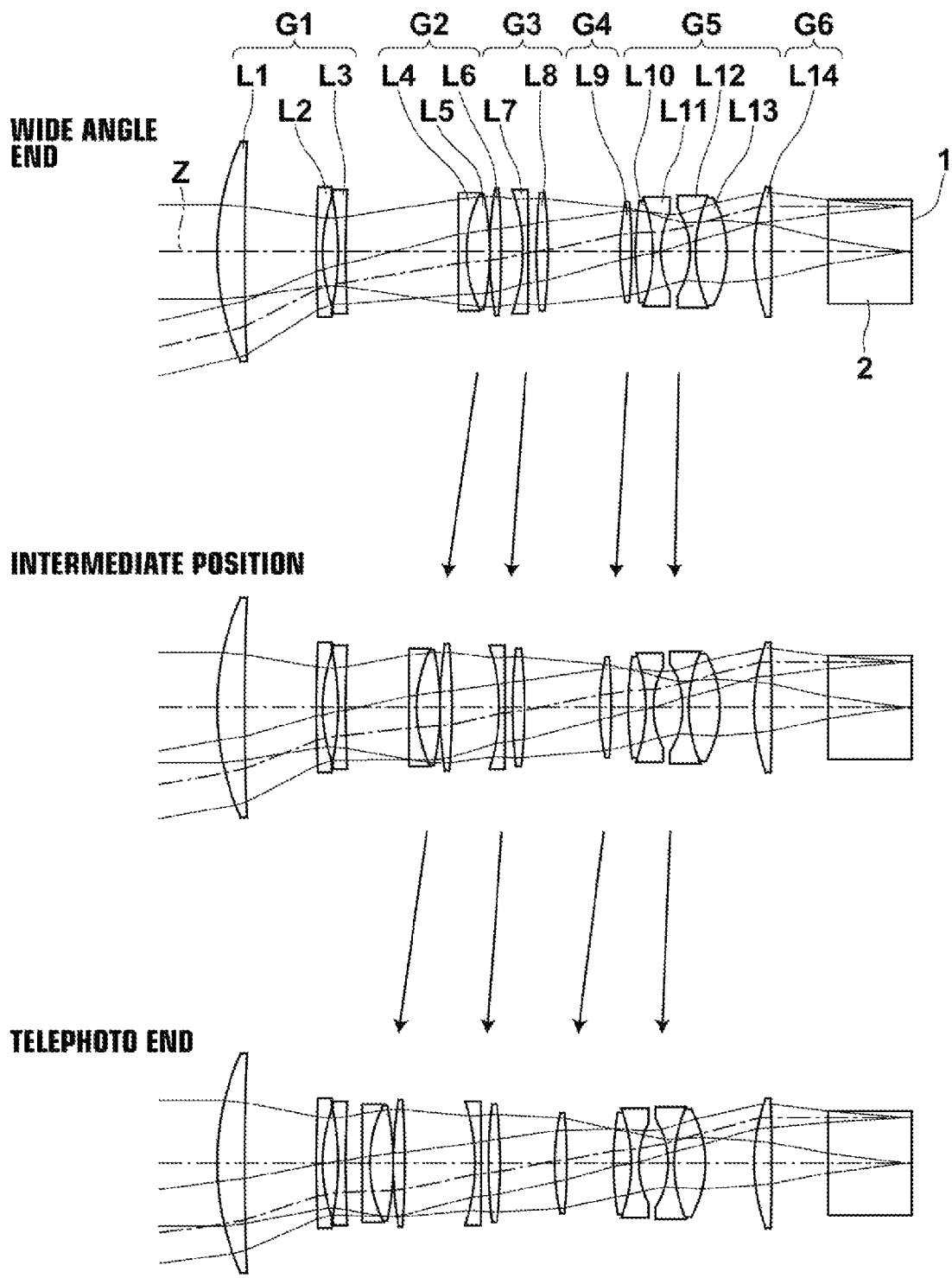
FIG.9    EXAMPLE 9

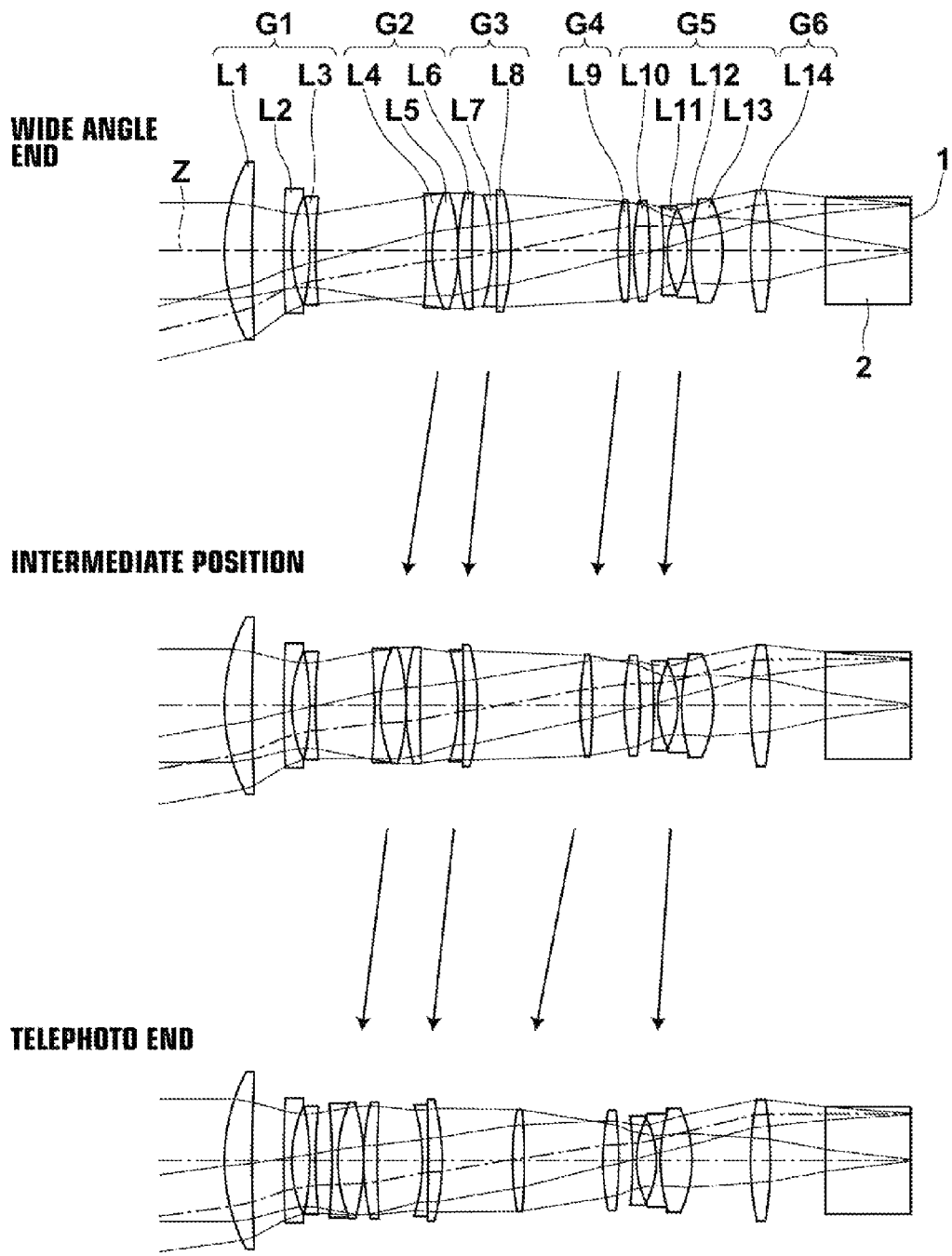

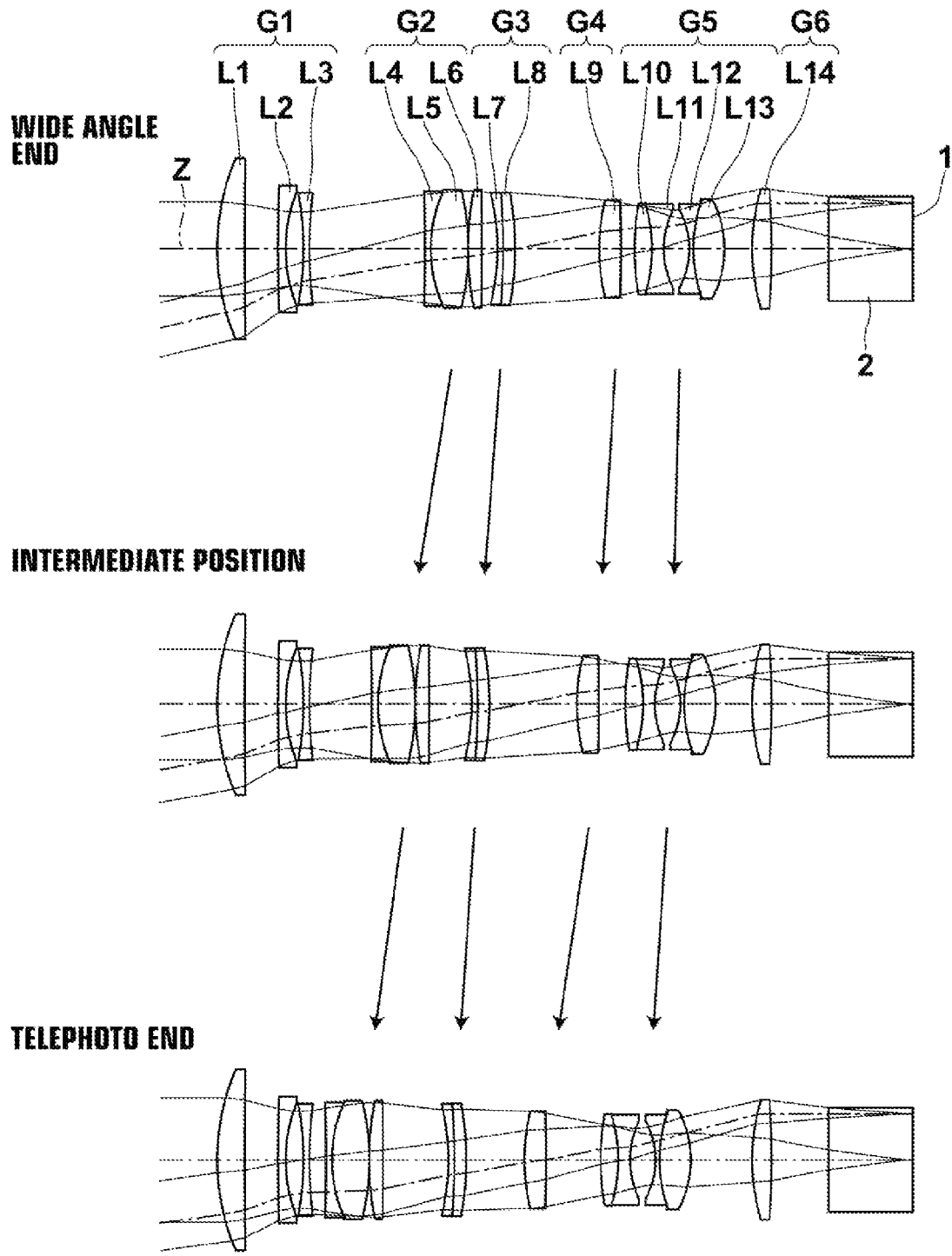

PROJECTION ZOOM LENS AND PROJECTION TYPE DISPLAY DEVICE

TECHNICAL FIELD

The present invention is related to a projection zoom lens and a projection type display device, for example, to a projection zoom lens that can be favorably used for magnified projection of beams that bear video information from a light valve onto a screen, and to a projection type display device employing such a projection zoom lens.

BACKGROUND ART

Conventionally, projector devices (projection type display devices) that utilize a light valve, such as liquid crystal display elements, DMD's (Digital Micromirror Devices: registered trademark), or the like, have been commonly available, and the performance thereof has been improving. Particularly, there is demand for improvements in the resolution of projection lenses accompanying improvements in the resolution of light valves.

In addition, there is great demand to mount a high magnification ratio zoom lens having high versatility, a compact structure, higher performance, a wider angle, or designed for telephoto operation to be provided in a projection type display device, taking an increased degree of freedom in setting the distance to a screen, and indoor installation properties into consideration.

In response to such demands, projection zoom lenses with a first lens group having a negative refractive power provided at the most magnification side, a sixth lens group having a positive refractive power at the most reduction side, and second through fifth lens groups that move when changing magnification therebetween, have been proposed (refer to Japanese Unexamined Patent Publication Nos. 2005-084455, 2008-275713, 2008-304765, 2010-156762, and 2009-210594, for example)

DISCLOSURE OF THE INVENTION

Recently, competitive development has been escalating. Accompanying this escalation, demands with respect to zoom lenses in the above technical field are becoming more stringent. There is demand for a projection zoom lens having a small F number, high versatility, as well as further miniaturization, higher performance, and a higher zoom ratio.

However, the projection zoom lens disclosed in Japanese Unexamined Patent Publication No. 2005-084455 is configured such that the second lens group moves toward the reduction side when changing magnification from a wide angle end to a telephoto end. Therefore, there is room for improvement with regard to realizing telephoto operation, a high zoom ratio, and miniaturization simultaneously. The lens most toward the magnification side is a negative lens in the projection zoom lenses disclosed in Japanese Unexamined Patent Publication Nos. 2008-275713, 2008-304765, and 2010-156762. It cannot be said that such a configuration is favorably suited to realize a telephoto system while decreasing the diameter thereof. Japanese Unexamined Patent Publication No. 2009-210594 discloses a projection zoom lens that realizes a high zoom ratio and telephoto operation. However, three positive lenses are sequentially provided toward the reduction side, and there is difficulty in realizing a smaller F number or greater telephoto operation.

The present invention has been developed in view of the foregoing circumstances. It is an object of the present invention to provide a compact and versatile projection zoom lens having a telecentric reduction side, a high zoom ratio, a small F number, and favorable projection performance. It is another object of the present invention to provide a projection type display device equipped with such a projection zoom lens.

A first projection zoom lens of the present invention substantially consists of six lens groups, including:

a first lens group having a negative refractive power, which is fixed when changing magnification;

second, third, fourth, and fifth lens groups that move when changing magnification; and a sixth lens group having a positive refractive power, which is fixed when changing magnification, provided in this order from a magnification side;

the reduction side being telecentric;

the second lens group being configured to move toward the magnification side when changing magnification from a wide angle end to a telephoto end;

the first and second lenses from a reduction side of the fifth lens group being a positive lens and a negative lens, respectively;

the sixth lens group being a single positive lens; and the projection zoom lens satisfying Conditional Formula (1) below:

$$-2.0 < fw/f5 < 0.1 \tag{1}$$

wherein fw is the focal length of the entire system at the wide angle end, and f5 is the focal length of the fifth lens group.

A second projection zoom lens of the present invention substantially consists of six lens groups, including:

a first lens group having a negative refractive power, which is fixed when changing magnification;

second, third, fourth, and fifth lens groups that move when changing magnification; and a sixth lens group having a positive refractive power, which is fixed when changing magnification, provided in this order from a magnification side;

the reduction side being telecentric;

the second lens group being configured to move toward the magnification side when changing magnification from a wide angle end to a telephoto end;

the lens most toward the magnification side in the entire system being a positive lens;

the first and second lenses from a reduction side of the fifth lens group being a positive lens and a negative lens, respectively;

the sixth lens group being a single positive lens; and the projection zoom lens satisfying Conditional Formula (2) below:

$$0.7 < Bf/fw \cdot Zr \tag{2}$$

wherein Bf is the back focus (air converted distance) of the entire system, fw is the focal length of the entire system at the wide angle end, and Zr is a zoom ratio.

In the first and second projection zoom lenses of the present invention, it is preferable for the second lens group to have a positive refractive power. In the case that the second lens group has a positive refractive power, it is preferable for the third lens group to have a negative refractive power and the fourth lens group to have a positive refractive power.

It is preferable for the first and second zoom lenses of the present invention to satisfy Conditional Formula (1') below:

$$-2.0 < fw/f5 < 0.0 \tag{1'}$$

wherein f5 is the focal length of the fifth lens group.

It is preferable for the first and second zoom lenses of the present invention to satisfy Conditional Formula (2') below:

$$0.7 < Bf/fw \cdot Zr < 2.0 \quad (2')$$

wherein Bf is the back focus (air converted distance) of the entire system, and Zr is a zoom ratio.

It is preferable for the first and second zoom lenses of the present invention to satisfy Conditional Formulae (3A), (3B), and (3C) below, and more preferably Conditional Formulae (3A'), (3B'), and (3C') below:

$$fF46w/fw < 0.0 \quad (3A)$$

$$fF46m/fw < 0.0 \quad (3B)$$

$$fF46t/fw < 0.0 \quad (3C)$$

$$-2.5 < fF46w/fw < 0.0 \quad (3A')$$

$$-2.5 < fF46m/fw < 0.0 \quad (3B')$$

$$-2.5 < fF46t/fw < 0.0 \quad (3C')$$

wherein fF46w is the combined front focus of the fourth lens group, the fifth lens group, and the sixth lens group at the wide angle end, fF46m is the combined front focus of the fourth lens group, the fifth lens group, and the sixth lens group in a midpoint focal length state (a state in which the focal length of the entire system is $(fw \cdot ft)^{1/2}$ when the focal length of the entire system at the wide angle end is designated as fw and the focal length of the entire system at the telephoto end is designated as ft), and fF46t is the combined front focus of the fourth lens group, the fifth lens group, and the sixth lens group at the telephoto end.

Here, the sign of the front focus is negative if the combined focal point position toward the magnification side of the fourth lens group, the fifth lens group, and the sixth lens group is more toward the magnification side than the surface of the fourth lens group most toward the magnification side, and positive when the combined focal point position is more toward the reduction side than the surface of the fourth lens group most toward the magnification side.

It is preferable for the first and second zoom lenses of the present invention to satisfy Conditional Formulae (4A), (4B), and (4C) below, and more preferably Conditional Formulae (4A'), (4B'), and (4C') below:

$$0.0 < Im\phi/f56w < 0.5 \quad (4A)$$

$$0.0 < Im\phi/f56m < 0.5 \quad (4B)$$

$$0.0 < Im\phi/f56t < 0.5 \quad (4C)$$

$$0.1 < Im\phi/f56w < 0.5 \quad (4A')$$

$$0.1 < Im\phi/f56m < 0.5 \quad (4B')$$

$$0.1 < Im\phi/f56t < 0.5 \quad (4C')$$

wherein $Im\phi$ is the maximum effective image diameter at the reduction side, f56w is the combined focal length of the fifth lens group and the sixth lens group at the wide angle end, f56m is the combined focal length of the fifth lens group and the sixth lens group in a midpoint focal length state (a state in which the focal length of the entire system is $(fw \cdot ft)^{1/2}$ when the focal length of the entire system at the wide angle end is designated as fw and the focal length of the entire system at the telephoto end is designated as ft), and f56t is the combined focal length of the fifth lens group and the sixth lens group at the telephoto end.

It is preferable for the first and second projection zoom lenses of the present invention to satisfy Conditional Formula (5) below:

$$1.0 < Bf/Im\phi \quad (5)$$

wherein Bf is the back focus of the entire system (air converted distance), and $Im\phi$ is the maximum effective image diameter at the reduction side.

It is preferable for the first and second projection zoom lenses of the present invention to satisfy Conditional Formula (6) below, and more preferably Conditional Formula (6') below:

$$0.7 < BrG2/Brmx < 3.5 \quad (6)$$

$$0.8 < BrG2/Brmx < 2.5 \quad (6')$$

wherein BrG2 is the amount of displacement of the second lens group from the wide angle end to the telephoto end, and Brmx is the maximum value from among the amount of displacement of the third lens group from the wide angle end to the telephoto end, the amount of displacement of the fourth lens group from the wide angle end to the telephoto end, and the amount of displacement of the fifth lens group from the wide angle end to the telephoto end.

Here, the sign of the amount of displacement is positive if the position of a lens group at the telephoto end is more toward the magnification side than that at the wide angle end, and negative if the position of a lens group at the telephoto end is more toward the reduction side than that at the wide angle end.

It is preferable for the first and second zoom lenses of the present invention to satisfy Conditional Formula (7) below, and more preferably Conditional Formula (7') below:

$$2\omega t < 25 \quad (7)$$

$$2\omega t < 20 \quad (7')$$

wherein $2\omega t$ is the maximum full angle of view at the telephoto end.

It is preferable for the first and second zoom lenses of the present invention to satisfy Conditional Formula (8) below, and more preferably Conditional Formula (8') below:

$$1.5 < Zr \quad (8)$$

$$1.5 < Zr < 2.2 \quad (8')$$

wherein Zr is a zoom ratio.

It is preferable for the first and second zoom lenses of the present invention to satisfy Conditional Formula (9) below, and more preferably Conditional Formula (9') below:

$$0.4 < f2/fw < 1.1 \quad (9)$$

$$0.55 < f2/fw < 1.1 \quad (9')$$

wherein f2 is the focal length of the second lens group, and fw is the focal length of the entire system at the wide angle end.

It is preferable for the first and second zoom lenses of the present invention to satisfy Conditional Formula (10) below, and more preferably Conditional Formula (10') below:

$$0.6 < f6/fw < 1.8 \quad (10)$$

$$0.8 < f6/fw < 1.6 \quad (10')$$

wherein f6 is the focal length of the sixth lens group, and fw is the focal length of the entire system at the wide angle end.

A projection type display device of the present invention comprises:

a light source;

a light valve, into which light from the light source enters; and a projection zoom lens of the present invention that projects optical images formed by light modulated by the light valve onto a screen.

Note that the "magnification side" refers to the side toward which optical images are projected (the side toward a screen). For the sake of convenience, the side toward the screen will be referred to as the magnification side even in cases that optical images are reduced and projected. Meanwhile, the "reduction side" refers to a side toward an original image display region (the side toward a light valve). For the sake of convenience, the side toward the light valve will be referred to as the reduction side even in cases that optical images are reduced and projected.

Note that the expression "substantially consists of six lens groups" means that the projection zoom lens may include: lenses and lens groups without any practical refractive power; and optical elements other than lenses such as apertures, and cover glasses, in addition to the lens groups that were listed as constituent elements.

Note that the expression "the reduction side being telecentric" means that an angular line that bisects the cross section of a light beam focused at an arbitrary point on an image surface at the reduction side between the maximum ray of light at the upper side and the maximum ray of light at the lower side thereof is close to being parallel with an optical axis. The expression "the reduction side being telecentric" is not limited to cases in which the reduction side is completely telecentric, that is, cases in which the bisecting angular line is completely parallel to the optical axis, but also refers to cases in which a certain degree of error is present. Here, the certain degree of error refers to a range of inclination between the bisecting angular line and the optical path of ±3°.

Note that the "lens groups" are not necessarily constituted by a plurality of lenses, and include those that are constituted by a single lens.

Note that the "back focus" and "front focus" refer to distances, considering the magnification side and the reduction side as corresponding to the object side and the image side of a common imaging lens. That is, the magnification side and the reduction side are considered as the front side and the back side, respectively.

Note that the value of "Imφ" can be obtained from the specifications of the projection zoom and the specifications of the device on which the projection zoom lens is mounted.

In the first projection zoom lens of the present invention, the negative first lens group, which remains fixed when changing magnification, is placed most toward the magnification side, the positive sixth lens group, which remains fixed when changing magnification, is placed most toward the reduction side, the four lens groups that move when changing magnification are placed between the first lens group and the sixth lens group, the reduction side is telecentric, the directions in which the second lens group move when changing magnification are set favorably, and the lens configurations of the fifth lens group and the sixth lens group are set favorably. In addition, the first projection zoom lens satisfies Conditional Formula (1). Therefore, miniaturization, an increased zoom ratio, a small F number, high versatility, and favorable projection performance can be realized simultaneously.

In the second projection zoom lens of the present invention, the negative first lens group, which remains fixed when changing magnification, is placed most toward the magnification side, the positive sixth lens group, which remains fixed when changing magnification, is placed most toward the reduction side, the four lens groups that move when changing magnification are placed between the first lens group and the sixth lens group, the reduction side is telecentric, the directions in which the second lens group move when changing magnification are set favorably, and the lens configurations of the lens most toward the magnification side, the fifth lens group, and the sixth lens group are set favorably. In addition, the second projection zoom lens satisfies Conditional Formula (2). Therefore, miniaturization, an increased zoom ratio, a small F number, high versatility, and favorable projection performance can be realized simultaneously.

In addition, the projection type display device of the present invention is equipped with the projection zoom lens of the present invention. Therefore, the projection type display device can be of a compact configuration, and simultaneously have a high zoom ratio, a small F number, high versatility, and favorable projection performance.

BRIEF DESCRIPTION OF THE DRAWINGS

FIG. 1 is a collection of sectional diagrams that illustrate the lens configuration of and trajectories of rays of light through a projection zoom lens according to Example 1 of the present invention.

FIG. 2 is a collection of sectional diagrams that illustrate the lens configuration of and trajectories of rays of light through a projection zoom lens according to Example 2 of the present invention.

FIG. 3 is a collection of sectional diagrams that illustrate the lens configuration of and trajectories of rays of light through a projection zoom lens according to Example 3 of the present invention.

FIG. 4 is a collection of sectional diagrams that illustrate the lens configuration of and trajectories of rays of light through a projection zoom lens according to Example 4 of the present invention.

FIG. 5 is a collection of sectional diagrams that illustrate the lens configuration of and trajectories of rays of light through a projection zoom lens according to Example 5 of the present invention.

FIG. 6 is a collection of sectional diagrams that illustrate the lens configuration of and trajectories of rays of light through a projection zoom lens according to Example 6 of the present invention.

FIG. 7 is a collection of sectional diagrams that illustrate the lens configuration of and trajectories of rays of light through a projection zoom lens according to Example 7 of the present invention.

FIG. 8 is a collection of sectional diagrams that illustrate the lens configuration of and trajectories of rays of light through a projection zoom lens according to Example 8 of the present invention.

FIG. 9 is a collection of sectional diagrams that illustrate the lens configuration of and trajectories of rays of light through a projection zoom lens according to Example 9 of the present invention.

FIG. 10 is a collection of sectional diagrams that illustrate the lens configuration of and trajectories of rays of light through a projection zoom lens according to Example 10 of the present invention.

FIG. 11 is a collection of sectional diagrams that illustrate the lens configuration of and trajectories of rays of light through a projection zoom lens according to Example 11 of the present invention.

Figure 13:
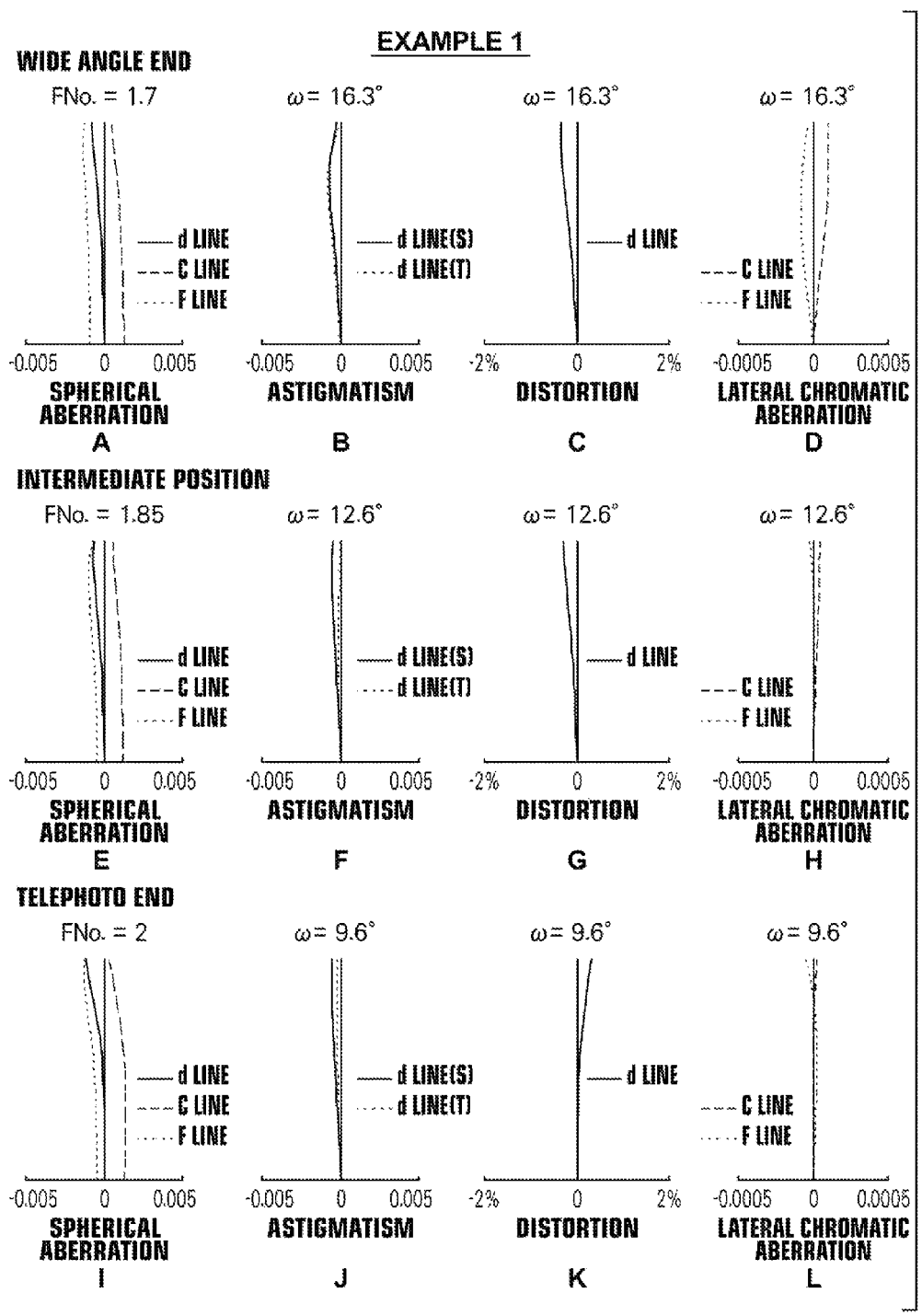

A through L of FIG. 13 are diagrams that illustrate aberrations of the projection zoom lens according to Example 1.

Figure 14:
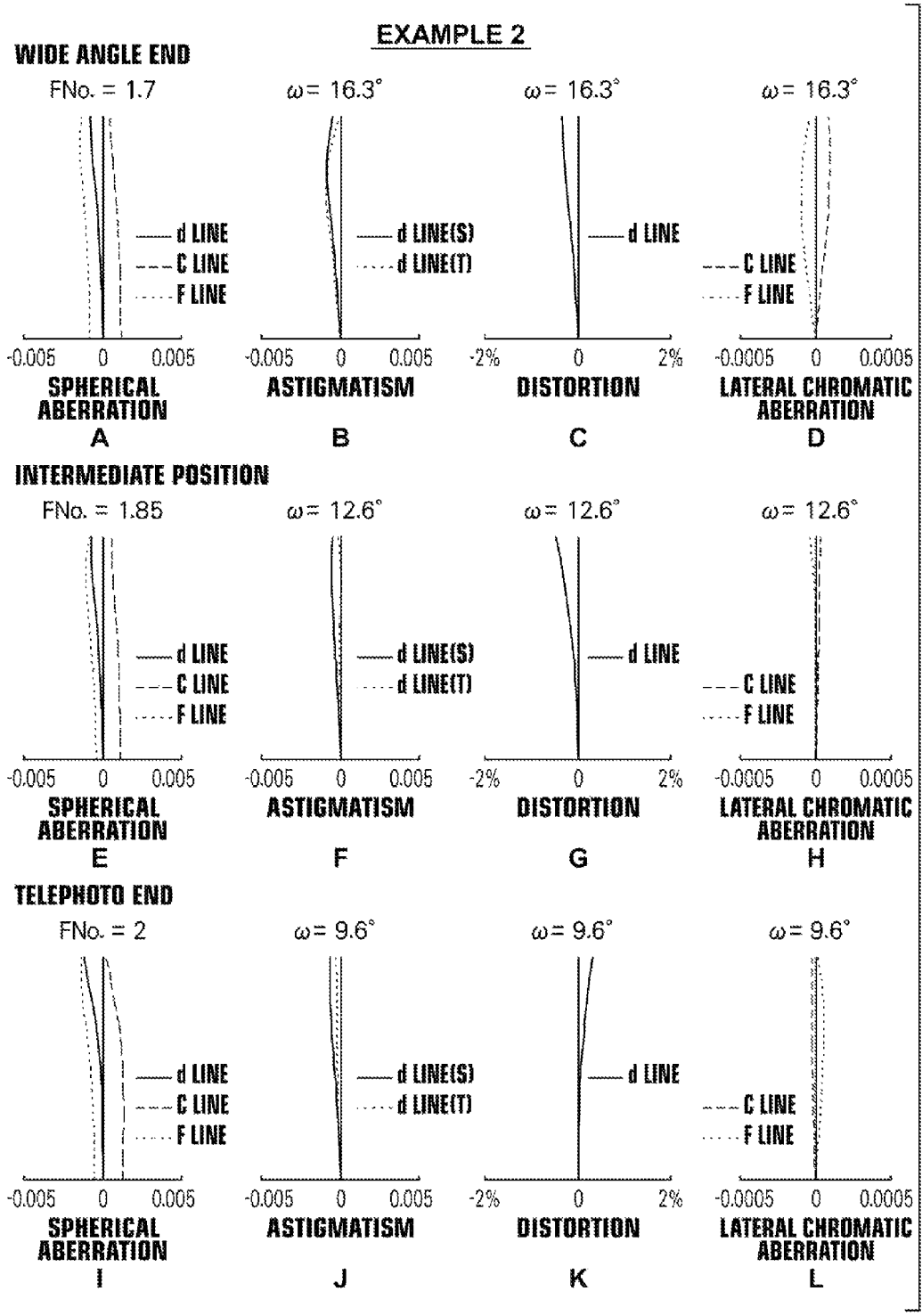

A through L of FIG. 14 are diagrams that illustrate aberrations of the projection zoom lens according to Example 2.

Figure 15:
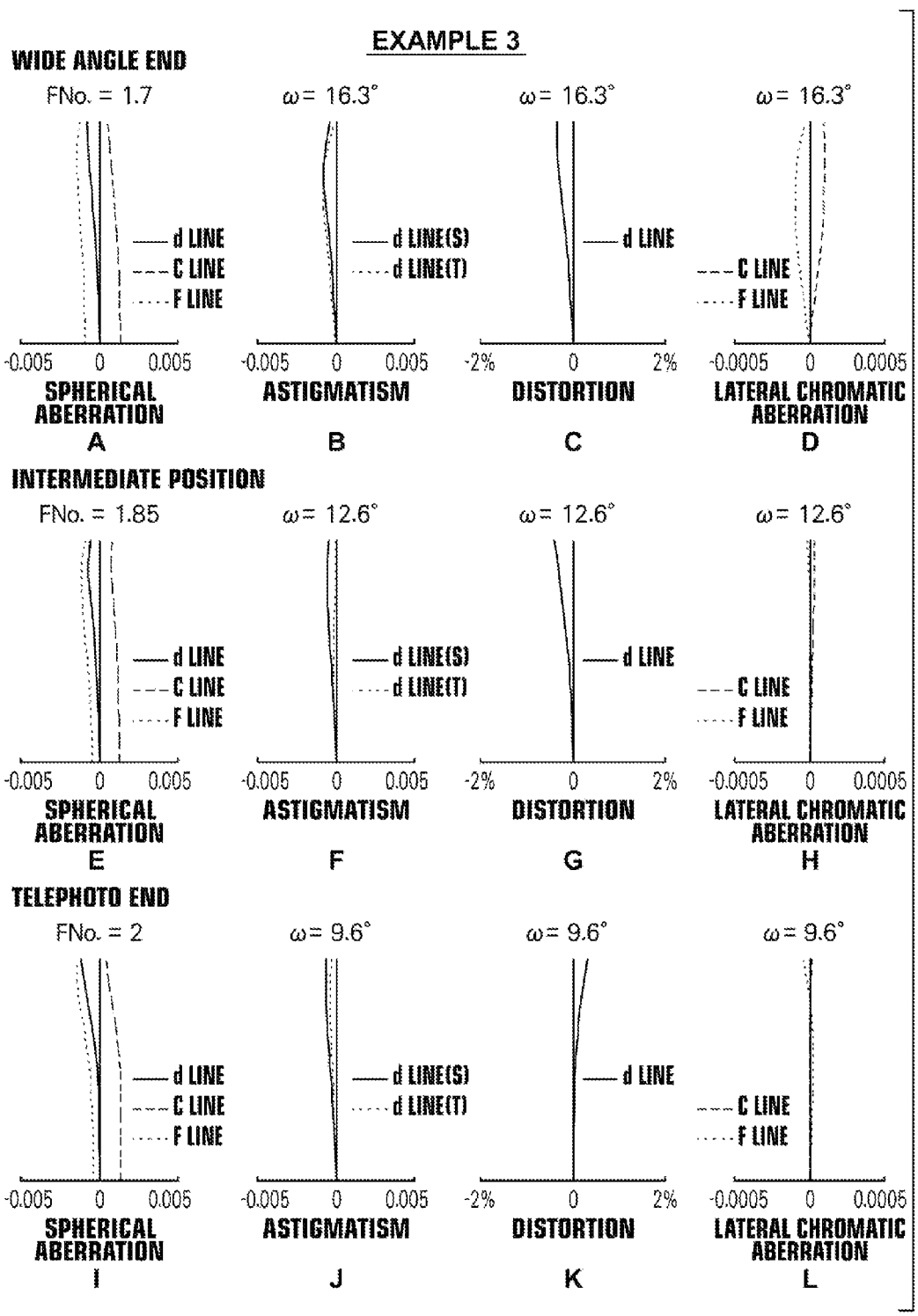

A through L of FIG. 15 are diagrams that illustrate aberrations of the projection zoom lens according to Example 3.

Figure 16:
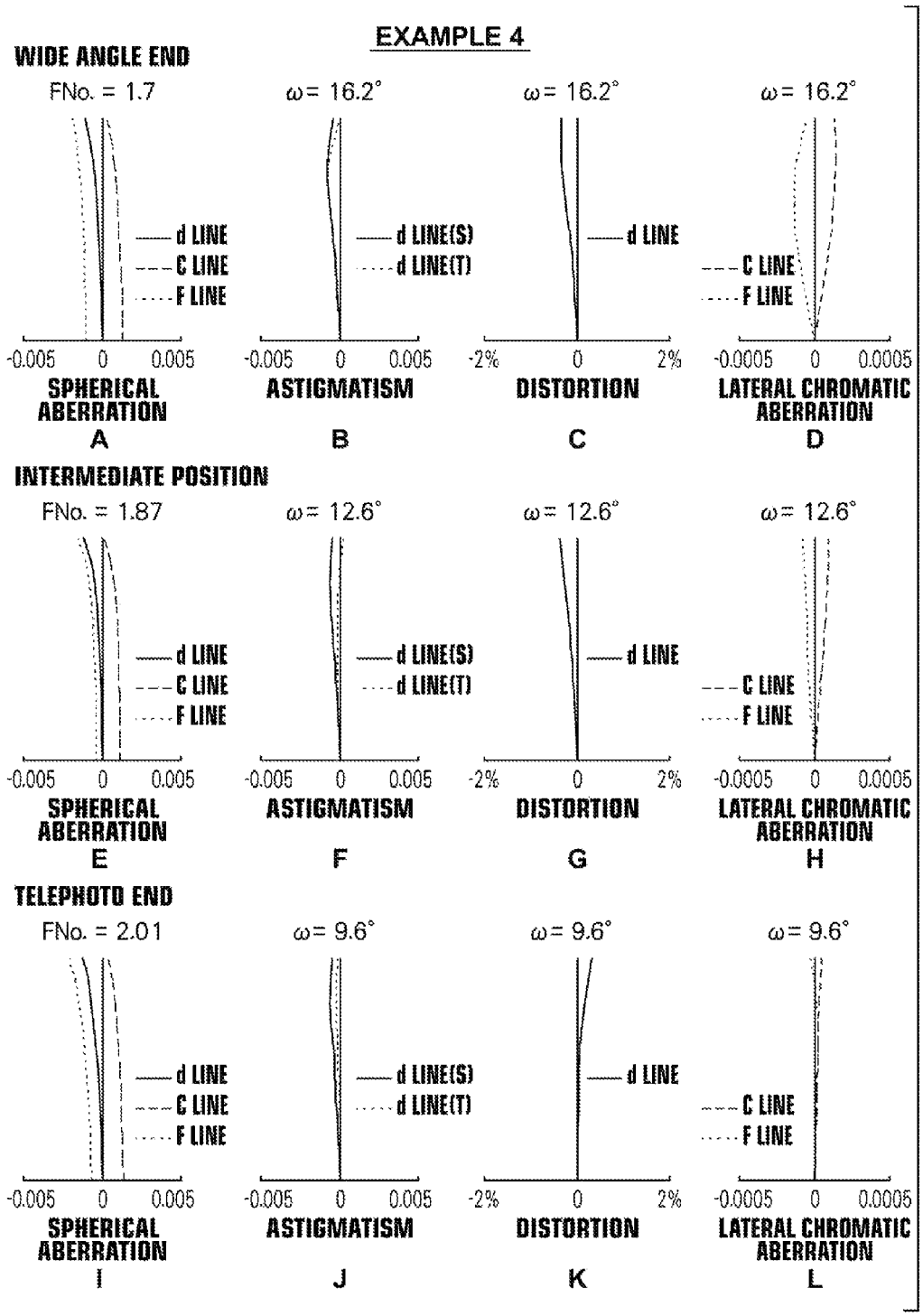

A through L of FIG. 16 are diagrams that illustrate aberrations of the projection zoom lens according to Example 4.

Figure 17:
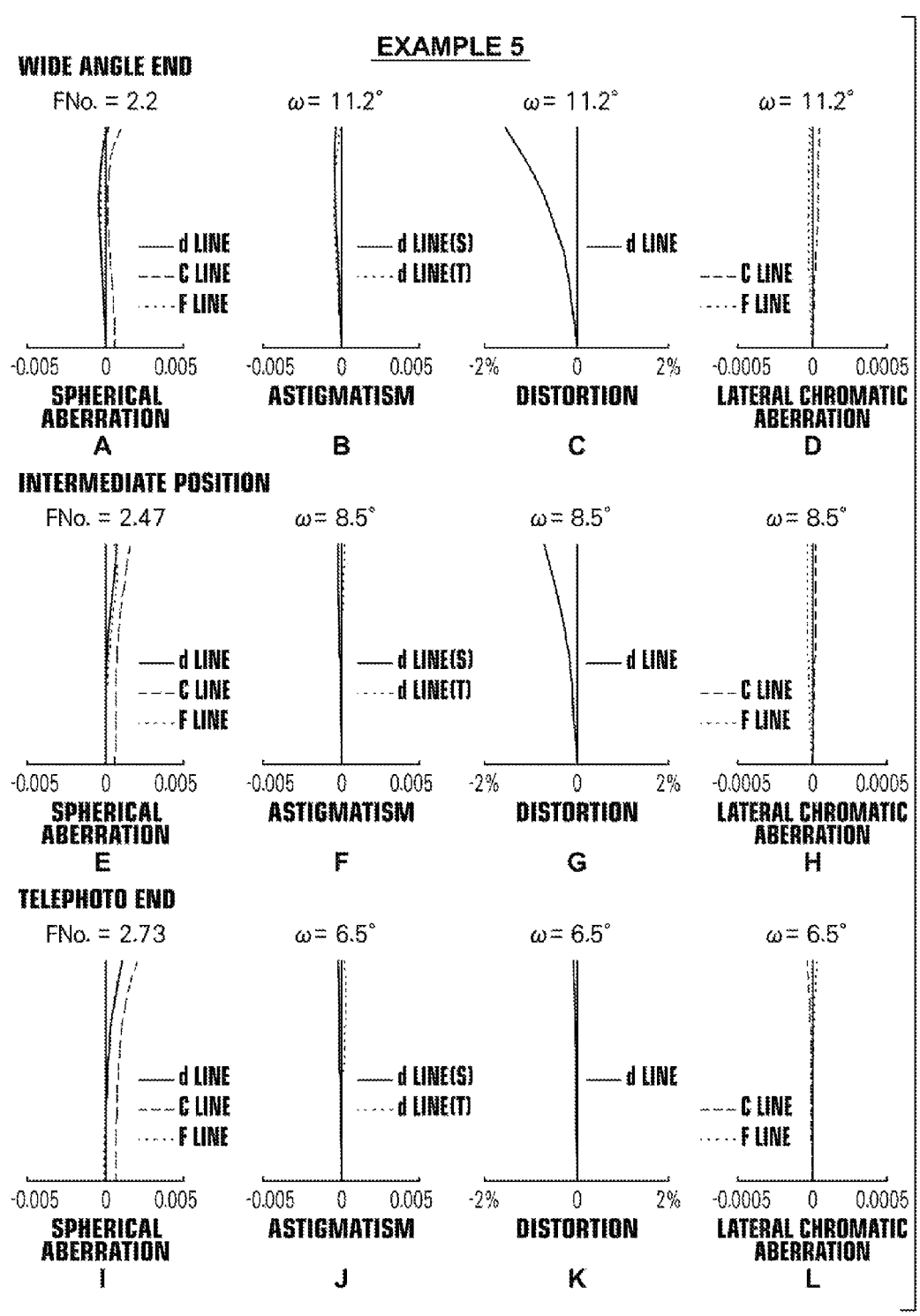

A through L of FIG. 17 are diagrams that illustrate aberrations of the projection zoom lens according to Example 5.

Figure 18:
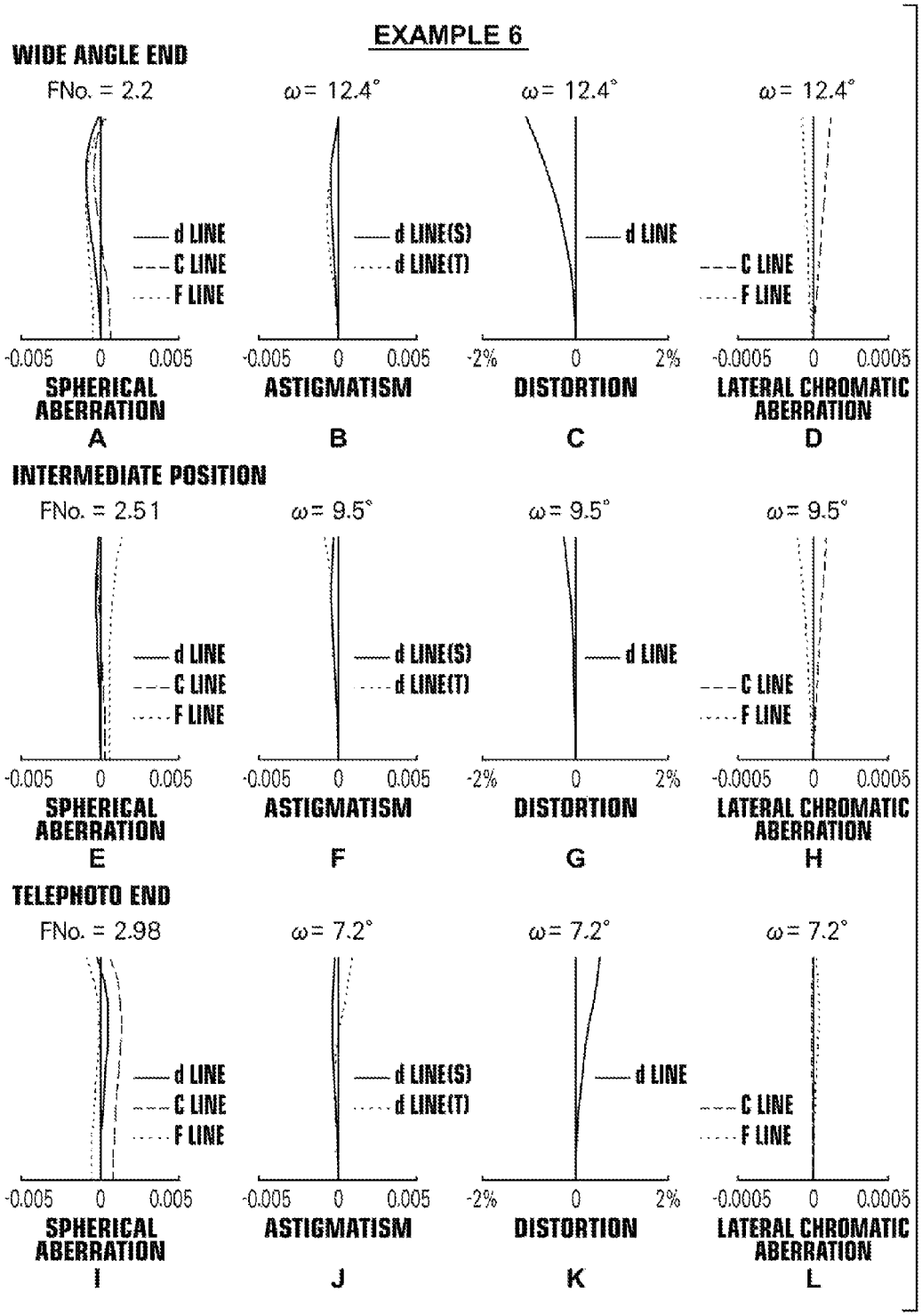

A through L of FIG. 18 are diagrams that illustrate aberrations of the projection zoom lens according to Example 6.

Figure 19:
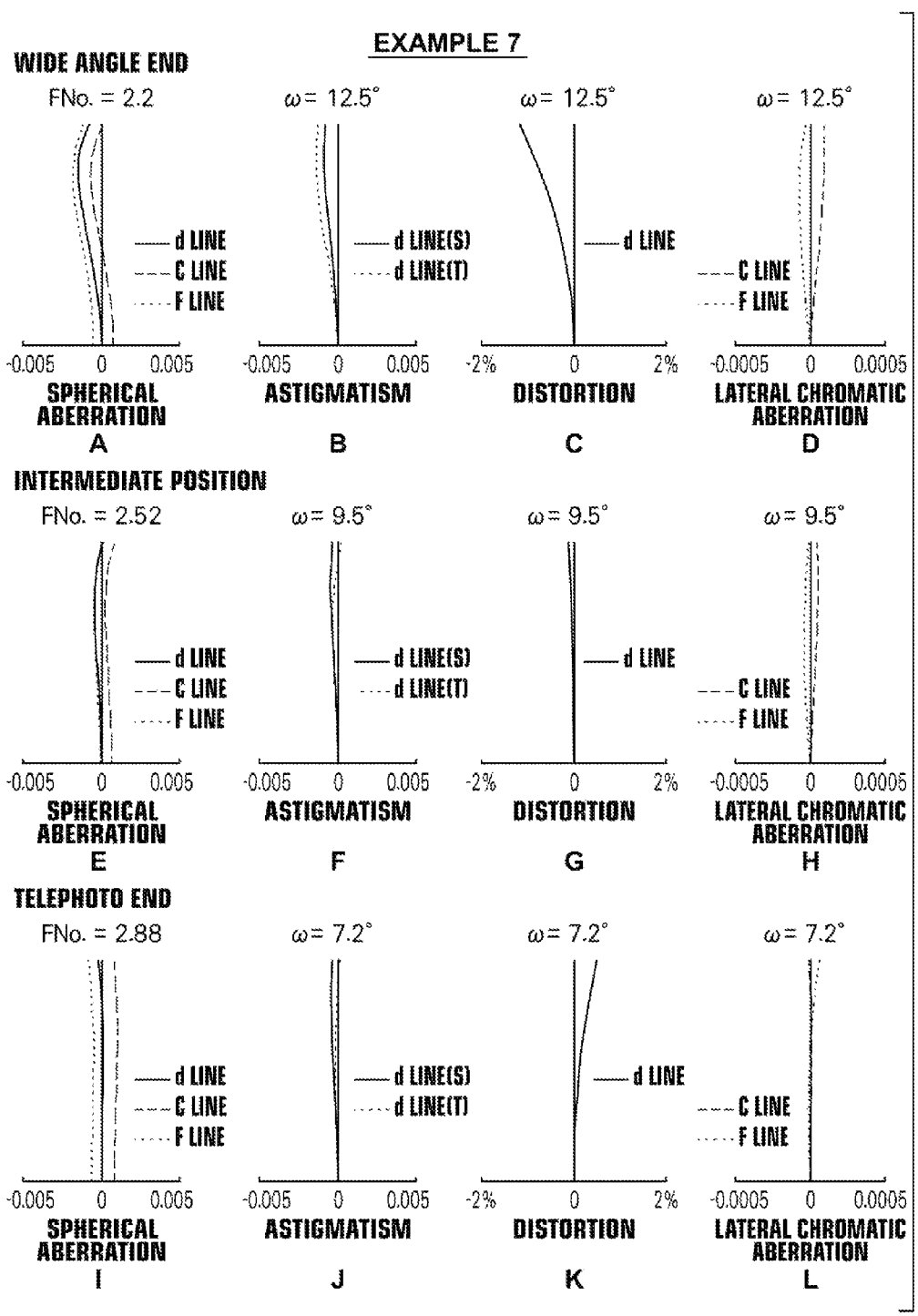

A through L of FIG. 19 are diagrams that illustrate aberrations of the projection zoom lens according to Example 7.

Figure 20:
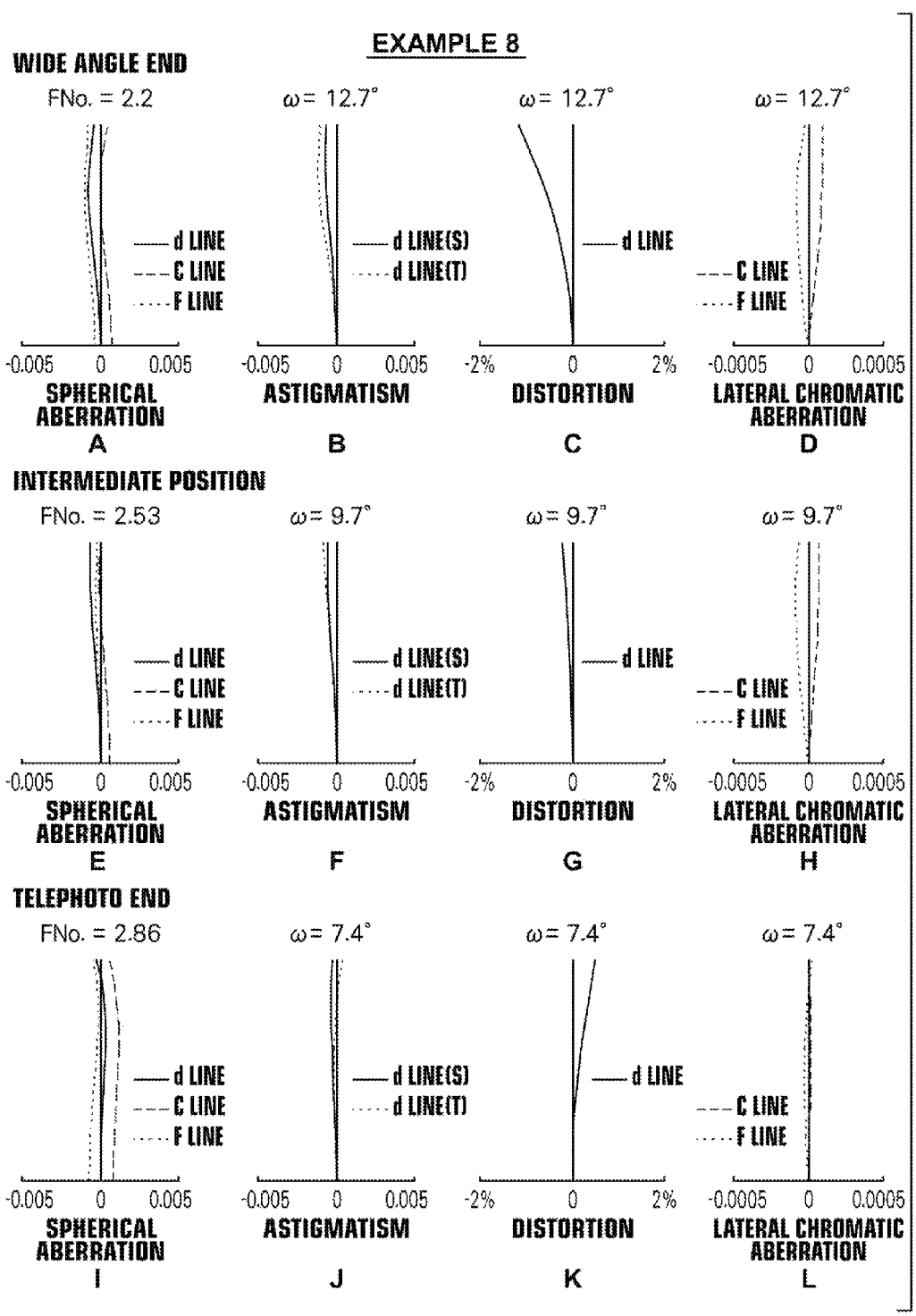

A through L of FIG. 20 are diagrams that illustrate aberrations of the projection zoom lens according to Example 8.

Figure 21:
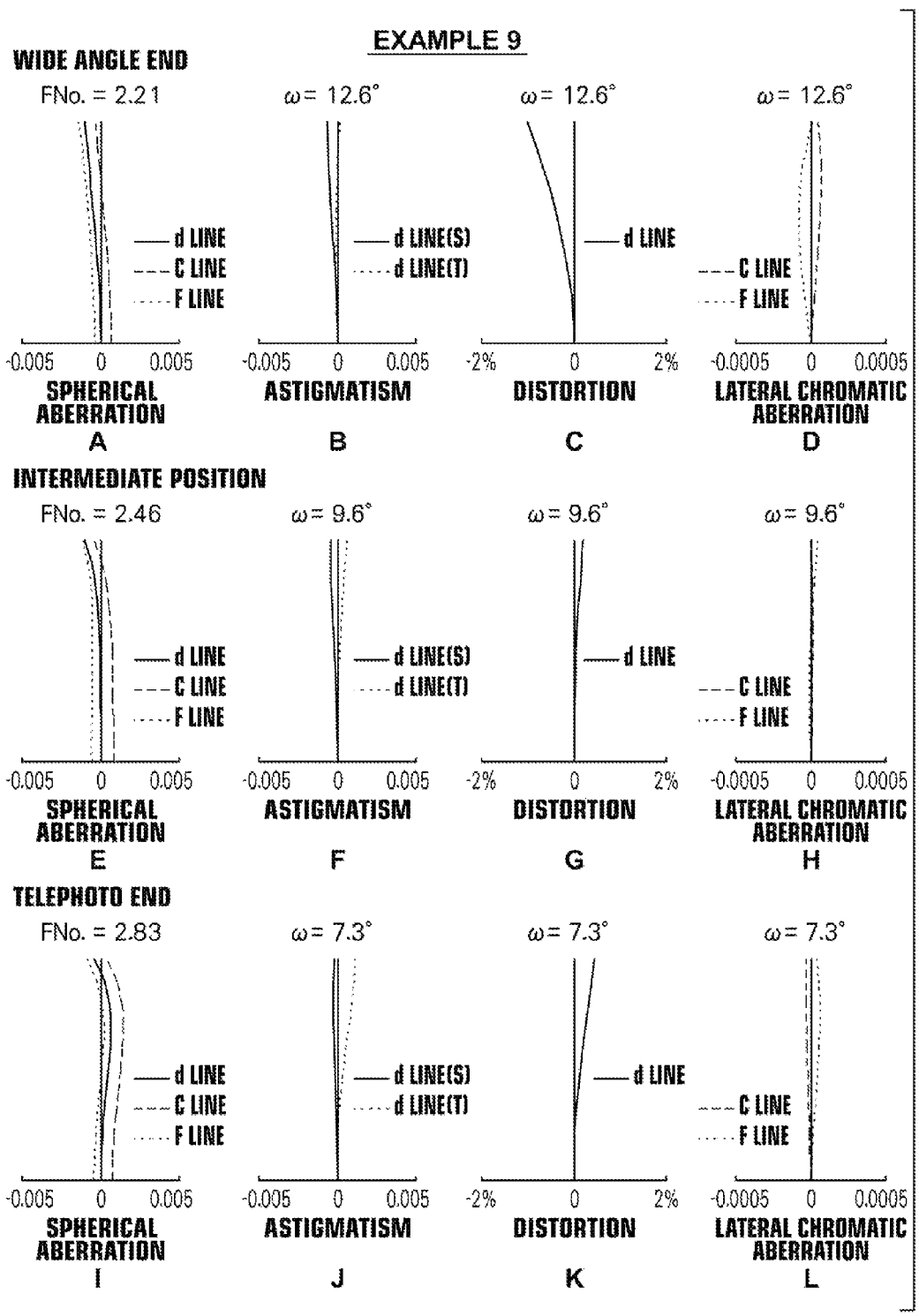

A through L of FIG. 21 are diagrams that illustrate aberrations of the projection zoom lens according to Example 9.

Figure 22:
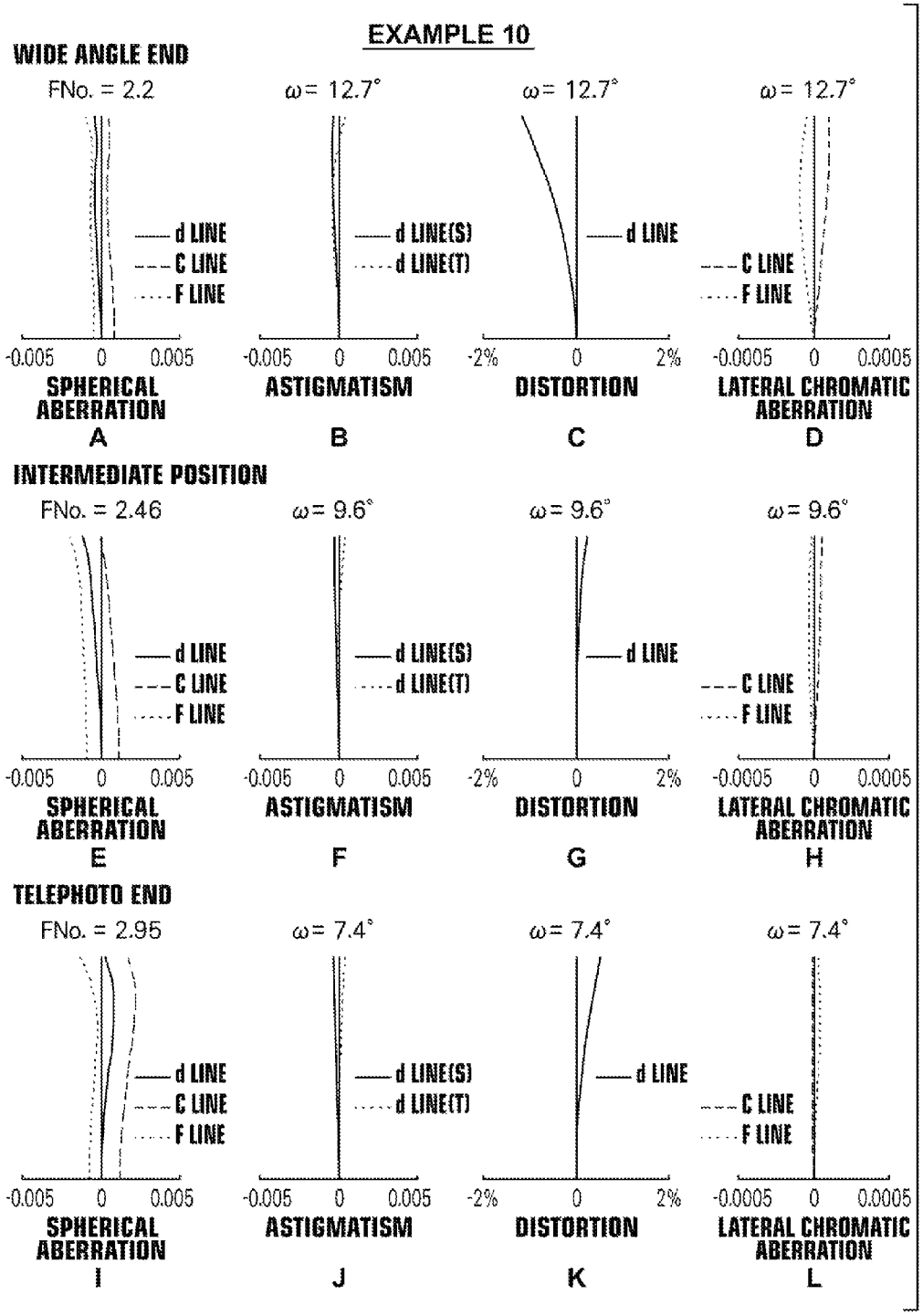

A through L of FIG. 22 are diagrams that illustrate aberrations of the projection zoom lens according to Example 10.

Figure 23:
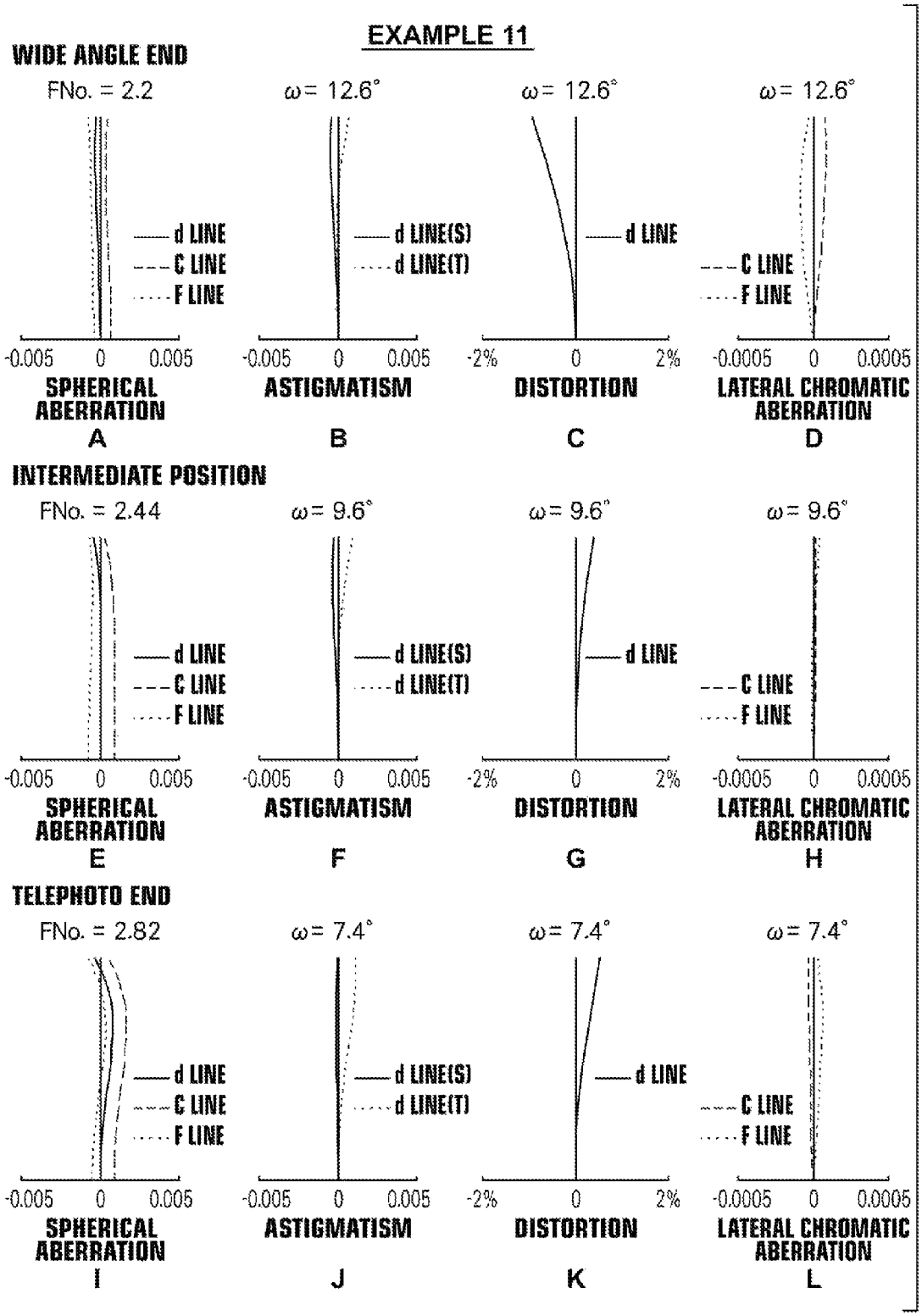

A through L of FIG. 23 are diagrams that illustrate aberrations of the projection zoom lens according to Example 11.

Figure 24:
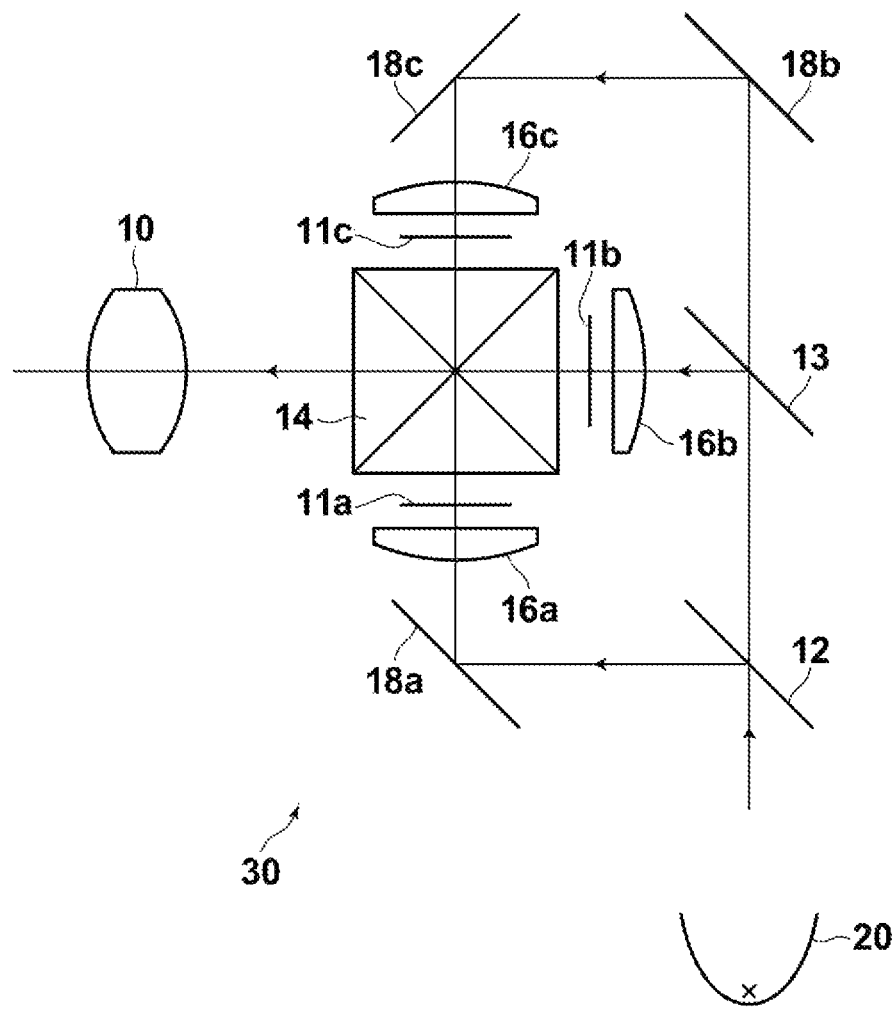

FIG. 24 is a diagram that illustrates the schematic configuration of a projection type display device according to an embodiment of the present invention.

BEST MODE FOR CARRYING OUT THE INVENTION

Hereinafter, embodiments of the present invention will be described in detail with reference to the accompanying drawings. FIGS. 1 through 11 are collections of sectional diagrams that illustrate examples of the configurations of projection zoom lenses according to embodiments of the present invention. Each of the projection zoom lenses illustrated in FIGS. 1 through 11 respectively correspond to projection zoom lenses of Examples 1 through 11 to be described later. The basic configurations of the examples illustrated in FIGS. 1 through 11 are the same, and the manners in which the configurations are illustrated are also the same. Therefore, the projection zoom lenses according to the embodiments of the present invention will be described mainly with reference to FIG. 1.

FIG. 1 is a collection of sectional diagrams that illustrate the lens configuration of a projection zoom lens according to an embodiment of the present invention. FIG. 1 illustrates the arrangements and configurations of lens groups at a wide angle end, an intermediate focal length state, and a telephoto end. FIG. 1 further illustrates the trajectories of axial rays of light and rays of light related to a maximum angle of view.

The projection zoom lens is capable of being utilized as a projection lens which is mounted on a projection type display device, for example, and projects image information displayed on a light valve onto a screen. In FIG. 1, the left side is a magnification side, and the right side is a reduction side. Presuming a case in which the projection zoom lens is mounted on a projection type display device, a glass block 2, which functions as filters, prisms, etc. of a color combining section or an illumination light separating section, and an image display surface 1 of a light valve, positioned at the surface of the glass block 2 toward the reduction side, are also illustrated in FIG. 1.

In the projection type display device, light beams, to which the image information is imparted by the image display surface 1, enter the projection zoom lens via the glass block 2. The projection zoom lens projects the beams onto a screen (not shown) disposed toward the left side direction of the drawing sheet.

Note that although FIG. 1 illustrates an example in which the position of the surface of the glass block 2 toward the reduction side and the position of the image display surface 1 are the same, the projection zoom lens of the present invention is not limited to such a configuration. In addition, FIG. 1 illustrates only one image display surface 1. However, the projection type display device may be configured to separate beams from a light source into three primary colors with a color separating optical system. In this case, three light valves that respectively correspond to the three primary colors may be provided, to enable display of full color images. The projection zoom lens of the present embodiment substantially consists of six lens groups, including a first lens group G1 having a negative refractive power, a second lens group G2, a third lens group G3, a fourth lens group G4, a fifth lens group, and a sixth lens group having a positive refractive power. The projection zoom lens of the present embodiment is configured such that the reduction side is telecentric.

A negative lead type configuration, in which the lens group most toward the magnification side is a negative lens group and the lens group most toward the reduction side is a positive lens group, enables an increase in the diameter of the lens most toward the magnification side, the diameter of which has a tendency to increase, to be suppressed compared to a positive lead type configuration. Therefore, the negative lead type configuration is advantageous from the viewpoint of miniaturization. In addition, securing a length of back focus necessary for inserting prisms, etc. is facilitated in a negative lead type configuration.

The first lens group G1 and the sixth lens group G6 are fixed, while the second lens group G2, the third lens group G3, the fourth lens group G4, and the fifth lens group G5 move when changing magnification. In FIG. 1, the directions of movement of the lens groups that move when changing magnification from the wide angle end to the intermediate focal length state and when changing magnification from the intermediate focal length state to the telephoto end are schematically indicated by the arrows between each position.

The projection zoom lens of the present embodiment is configured to have a zoom function by the four lens groups, the second lens group G2 through the fifth lens group G5, moving when changing magnification. That is, the magnification changing function is divided among the four lens groups. Therefore, it becomes possible to simultaneously satisfy requirements with respect to miniaturization, high performance, high zoom ratio, and a small F number. It is difficult to satisfy these requirements simultaneously in cases that the number of lens groups that move when changing magnification is three or less.

Note that the projection zoom lens of the present embodiment is configured such that the second lens group G2 moves toward the magnification side when changing magnification from the wide angle end to the telephoto end. This configuration is adopted mainly due to the following circumstances.

With respect to the F numbers of telephoto lens systems, the sizes of lenses in the radial direction within moving groups greatly depend on the axial light beam diameter, because the diameters of axial light beams that enter the lens systems are greater than those for wide angle lens systems. If the first lens group is a negative lens group, axial light beams that exit the first lens group and enter the second lens group have a tendency to diffuse. Therefore, the diameter of axial light beams will become greater in lens systems having the second lens group toward the reduction side.

Accordingly, if the F number is the same at the wide angle end and at the telephoto end, and the first lens group is a negative lens group, the light beam diameter at the second lens group is already greater at the telephoto end than at the wide angle end in the case that the position of the second lens group is the same at the wide angle end and at the telephoto end. Therefore, if a configuration is adopted, in which the second lens group moves toward the reduction side when changing magnification to the wide angle end to the telephoto end, the light beam diameter at the second lens group will become even greater at the telephoto end. In order to prevent such an increase in the light beam diameter and to maintain the lens diameters of the lens groups that move small, it will be necessary to greatly increase the F number at the telephoto end and also to decrease the zoom ratio. If such measures are taken, it will become difficult to realize a compact lens system having a small F number and a high zoom ratio. Miniaturization, a small F number, and a high zoom ratio can be simultaneously realized by adopting the configuration in which the second lens group G2 moves toward the magnification side when changing magnification from the wide angle end to the telephoto end, for the reasons described above.

Note that it is preferable for the second lens group G2 to have a positive refractive power. In this case, the lens diameters of the lenses within the first lens group G1 can be decreased.

It is preferable for the third lens group G3 to have a negative refractive power, and for the fourth lens group G4 to have a positive refractive power. In the case that the second lens group G2 is a positive lens group, the third lens group G3 is a negative lens group, and the fourth lens group G4 is a positive lens group, the power balance of the lens configuration becomes favorable. This favorable power balance is advantageous from the viewpoint of miniaturization, by suppressing the amounts of movement of the lens groups that move when changing magnification, while favorably correcting variations in longitudinal chromatic aberration and field curvature across the entire range of zoom.

With respect to the configuration of each lens group, the first lens group G1 is constituted by three lenses, including a first lens L1 through a third lens L3, the second lens group G2 is constituted by three lenses, including a fourth lens L4 through a sixth lens L6, the third lens group G3 is constituted by two lenses, including a seventh lens L7 and an eighth lens L8, the fourth lens group G4 is constituted by three lenses, including a ninth lens L9 through an eleventh lens L11, the fifth lens group G5 is constituted by three lenses, including a twelfth lens L12 through a fourteenth lens L14, and the sixth lens group G6 is constituted by a single lens, a fifteenth lens L15, in the example illustrated in FIG. 1.

The sixth lens group G6 of the projection zoom lens of the present invention is constituted by a single positive lens. By configuring the fixed group toward the reduction side with a minimum number of lenses, the lens groups that move can be arranged and moved effectively in a limited lens length, which contributes to miniaturization. Note that the numbers of lenses that constitute the first lens group G1 through the fifth lens group G5 of the projection zoom lens of the present invention is not necessarily limited to those of the example illustrated in FIG. 1.

The first and second lenses from the reduction side of the fifth lens group G5 are respectively a positive lens and a negative lens. By adopting this configuration, lateral chromatic aberration can be favorably corrected. In addition, the sixth lens group G6 is constituted by a single positive lens. Therefore, if the first and second lenses from the reduction side of the fifth lens group G5 and the positive lens of the sixth lens group G6 are viewed from the magnification side, the arrangement of the lenses is a negative lens, a positive lens, and a positive lens. Accordingly, a configuration in which the amount of vertical movement of light rays is small can be achieved.

In the case that first and second lenses from the reduction side of the fifth lens group G5 and the single lens of the sixth lens group G6 are all positive lenses, three positive lenses will be consecutively arranged at the reduction side of the entire system. In such a case, axial light beams will converge excessively, and it will become necessary to increase the power of a negative lens in the fifth lens group G5 in order to achieve a telephoto lens configuration. This will result in difficulties in correcting field curvature and difficulties in realizing a lens system having a small F number.

Note that it is preferable for the first lens L1 which is provided most toward the magnification side of the entire system to be a positive lens. In the case that the first lens L1 is a positive lens, the diameters of the lenses that constitute the first lens group G1 can be decreased, and distortion can be favorably corrected.

Further, it is preferable for the projection zoom lens of the present embodiment to satisfy Conditional Formula (1) below:

$$-2.0 < fw/f5 < 0.1 \qquad (1)$$

wherein fw is the focal length of the entire system at the wide angle end, and f5 is the focal length of the fifth lens group.

Conditional Formula (1) is for favorably setting the refractive power of the fifth lens group G5, thereby suppressing the height of light rays at the lens groups toward the magnification side and preventing the lens system of becoming excessively large. If the value of fw/f5 is less than the lower limit defined in Conditional Formula (1), the height of an marginal axial light ray will become high at the first lens group G1 through the third lens group G3. Particularly, the diameters of the lenses that constitute second lens group G2 and the third lens group G3 will become great, resulting in difficulties in realizing a small f number and a telephoto system. If the value of fw/f5 is greater than the upper limit defined in Conditional Formula (1), the height of off axis light rays will become high at the first lens group G1, and it will become difficult to decrease the diameters of the lenses that constitute the first lens group G1.

Based on the above circumstances, it is more preferable for projection zoom lens of the present embodiment to satisfy Conditional Formula (1') below, and even more preferably Conditional Formula (1") below, in order to suppress an increase in the diameters of the lens groups toward the magnification side while maintaining a small F number and high versatility.

$$-2.0 < fw/f5 < 0.0 \qquad (1')$$

$$-2.0 < fw/f5 < -0.17 \qquad (1'')$$

In addition, it is preferable for the projection zoom lens of the present embodiment to satisfy Conditional Formula (2) below:

$$0.7 < Bf/fw \cdot Zr \qquad (2)$$

wherein Bf is the back focus (air converted distance) of the entire system, fw is the focal length of the entire system at the wide angle end, and Zr is a zoom ratio.

Conditional Formula (2) is for favorably setting the back focus and the zoom ratio with respect to the focal length of the entire system. If the value of Bf/fw·Zr is less than the lower limit defined in Conditional Formula (2), it will become difficult to sufficiently secure a back focus of appropriate length and a high zoom ratio.

It is more preferable for the projection zoom lens of the present embodiment to satisfy Conditional Formula (2') below.

$$0.7 < Bf/fw \cdot Zr < 2.0 \qquad (2')$$

If the value of Bf/fw·Zr is greater than the upper limit defined in Conditional Formula (2'), the back focus will be longer than necessary and the zoom ratio will become excessively great, resulting in an increase in the length of the entire system and an increase in cost. In the case that Conditional Formula (2') is satisfied, miniaturization and cost reduction are enabled while securing a back focus of an appropriate length and a high zoom ratio.

Note that it is even more preferable for the projection zoom lens of the present embodiment to satisfy Conditional Formula (2") below, in order to enable further miniaturization and cost reduction while securing a back focus of an appropriate length and a high zoom ratio.

$$0.7 < Bf/fw \cdot Zr < 1.4 \qquad (2'')$$

It is preferable for the projection zoom lens of the present embodiment to satisfy Conditional Formulae (3A), (3B), and (3C) below:

$$fF46w/fw < 0.0 \qquad (3A)$$

$$fF46m/fw < 0.0 \qquad (3B)$$

$$fF46t/fw < 0.0 \qquad (3C)$$

wherein fF46w is the combined front focus of the fourth lens group, the fifth lens group, and the sixth lens group at the wide angle end, fF46m is the combined front focus of the fourth lens group, the fifth lens group, and the sixth lens group in a midpoint focal length state (a state in which the focal length of the entire system is $(fw \cdot ft)^{1/2}$ when the focal length of the entire system at the wide angle end is designated as fw and the focal length of the entire system at the telephoto end is designated as ft), and fF46t is the combined front focus of the fourth lens group, the fifth lens group, and the sixth lens group at the telephoto end.

Note that, the sign of the front focus is negative if the combined focal point position toward the magnification side of the fourth lens group, the fifth lens group, and the sixth lens group is more toward the magnification side than the surface of the fourth lens group most toward the magnification side, and positive when the combined focal point position is more toward the reduction side than the surface of the fourth lens group most toward the magnification side.

It is more preferable for the projection zoom lens of the present embodiment to satisfy Conditional Formulae (3A'), (3B'), and (3C') below.

$$-2.5 < fF46w/fw < 0.0 \qquad (3A')$$

$$-2.5 < fF46m/fw < 0.0 \qquad (3B')$$

$$-2.5 < fF46t/fw < 0.0 \qquad (3C')$$

Conditional Formulae (3A), (3B), (3C), (3A'), (3B'), and (3C') are for favorably setting the combined front focus of the three lens groups toward the reduction side. As will be described below with reference to FIG. 12, in order to facilitate removal of unnecessary off axis light rays and to realize favorable telecentric properties, it is preferable for Conditional Formulae (3A), (3B), and (3C) to be satisfied, and more preferable for Conditional Formulae (3A'), (3B'), and (3C') to be satisfied.

Figure 12:
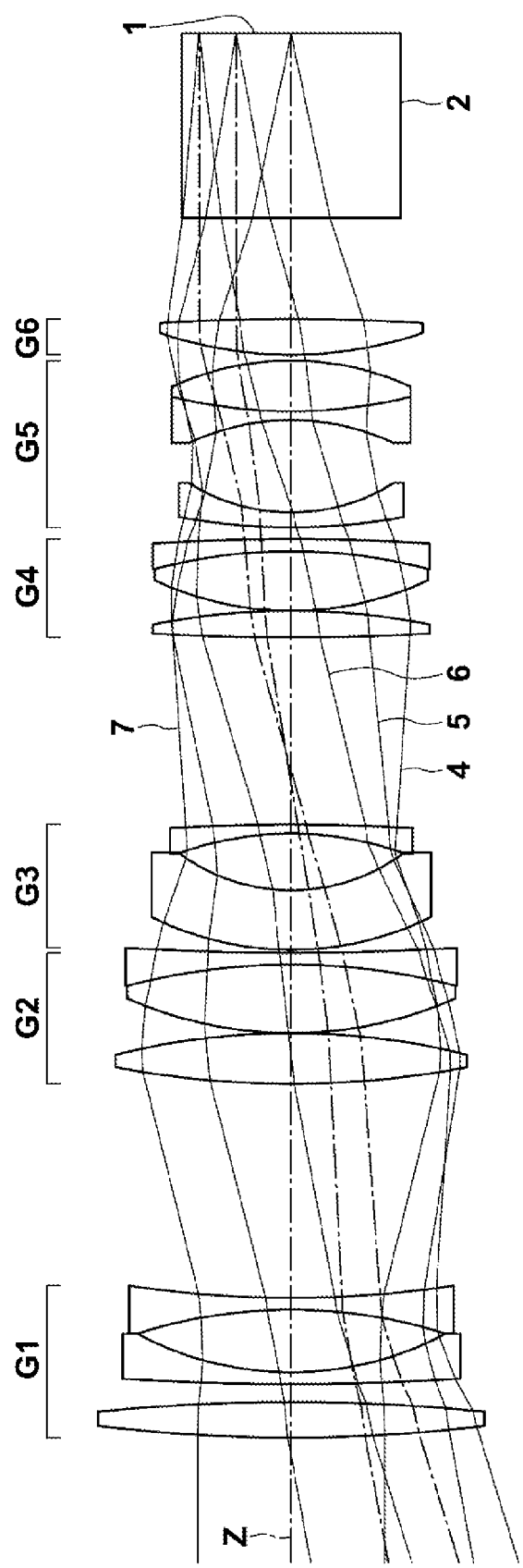
FIG. 12 is a diagram for explaining shielding of unnecessary rays of light.

FIG. 12 is a sectional diagram of the lenses of the projection zoom lens of FIG. 1 at the wide angle end, in which the trajectories of axial light rays, light rays of an intermediate angle of view, and light rays of a maximum angle of view are illustrated. In the following description, the lower maximum light ray from among the light rays included in the axial light rays will be referred to as the "lower axial light ray" and the upper maximum light ray included in the axial light rays will be referred to as the "upper axial light ray". Similarly, the lower maximum light ray from among the light rays included in the intermediate angle of view light rays will be referred to as the "lower intermediate angle of view light ray". The lower maximum light ray from among the light rays included in the maximum angle of view light rays will be referred to as the "lower maximum angle of view light ray". Here, the upper and lower maximum light rays are light rays having light ray heights having the greatest absolute values (light rays having the highest light ray heights) in the upper and lower directions. That is, the upper and lower maximum light rays are light rays which are the farthest away from the optical axis. FIG. 12 illustrates the lower axial light ray 4, the lower intermediate angle of view light ray 5, the lower maximum angle of view light ray 6, and the upper axial light ray 7.

It is preferable to shield and remove unnecessary rays of light, that cause telecentric properties and off axis optical performance to deteriorate, to a degree that results in no practical problems. However, when shielding light rays, it is necessary for the light rays which are to be shielded to be farther away from the optical axis toward the exterior than light rays other than those to be shielded, so that the light rays other than those to be shielded are not shielded.

For example, in the case that the lower intermediate angle of view light ray 5 is farther away from the optical axis toward the exterior than the lower axial light ray 4 and the lower maximum angle of view light ray 6 within a region from a portion of the third lens group G3 to the second lens group G2 as illustrated in FIG. 12, unnecessary rays of light beneath the intermediate angle of view can be shielded at positions within this range, to improve the telecentric properties and the off axis optical performance in the intermediate angle of view.

Achieving a state in which unnecessary light rays beneath the intermediate angle of view, which are to be shielded, are more toward the exterior than light rays other than those to be shielded is facilitated across the entire zoom range by satisfying Conditional Formulae (3A), (3B), and (3C), and the telecentric properties and the off axis optical performance in the intermediate angle of view can be improved. In the case that Conditional Formulae (3A), (3B), and (3C) are not satisfied, the lower maximum angle of view light ray 6 becomes likely to be most toward the exterior, which will lead to the unnecessary light rays beneath the intermediate angle of view not being able to be shielded. This will result in difficulties in securing telecentric properties, and a shortcoming that an off axis light beam will become large at lens groups toward the magnification side, leading to the lens diameters thereof becoming large.

Note that with respect to the lower maximum angle of view light ray 6, this light ray is farther away from the optical axis toward the exterior than the lower axial light ray 4 and the lower intermediate angle of view light ray 5 in the region from the second lens group G2 to the first lens group G1, as illustrated in FIG. 12. Therefore, shielding unnecessary light rays beneath the maximum angle of view within this region to improve the telecentric properties and the off axis optical performance may be considered.

However, if the value of fF46w/fw, fF46 m/fw, or fF46t/fw is less than the lower limit defined in one of Conditional Formulae (3A'), (3B'), and (3C'), a lower off axis light ray will be more toward the interior than the lower axial light ray 4 in a large portion of the lens system in the vicinity of a zoom range. Therefore, unnecessary off axis light rays cannot be removed, and telecentric properties will not be able to be maintained. In order to avoid this shortcoming, it will be necessary to provide the lens groups more toward the magnification side than the fourth lens group G4 further away from the fourth lens group G4 in the direction toward the magnification side, resulting in a greater total length. Miniaturization becomes possible while maintaining favorable telecentric properties by removing unnecessary off axis light beams across the entire range of zoom, by satisfying Conditional Formulae (3A'), (3B'), and (3C').

In addition, it is preferable for the fifth lens group G5 and the sixth lens group G6 of the projection zoom lens of the present embodiment to satisfy Conditional Formulae (4A), (4B), and (4C) below:

$$0.0 < Im\phi/f56w < 0.5 \quad (4A)$$

$$0.0 < Im\phi/f56m < 0.5 \quad (4B)$$

$$0.0 < Im\phi/f56t < 0.5 \quad (4C)$$

wherein $Im\phi$ is the maximum effective image diameter at the reduction side, f56w is the combined focal length of the fifth lens group and the sixth lens group at the wide angle end, f56m is the combined focal length of the fifth lens group and the sixth lens group in a midpoint focal length state (a state in which the focal length of the entire system is $(fw \cdot ft)^{1/2}$ when the focal length of the entire system at the wide angle end is designated as fw and the focal length of the entire system at the telephoto end is designated as ft), and f56t is the combined focal length of the fifth lens group and the sixth lens group at the telephoto end.

Conditional Formulae (4A), (4B), and (4C) are for favorably setting the relationship between the combined refractive power of the two lens groups toward the reduction side and an image circle at the reduction side. Increases in lens diameters can be suppressed across the entire zoom range and miniaturization is enabled, by the projection zoom lens of the present embodiment satisfying Conditional Formulae (4A), (4B), and (4C). If the value of $Im\phi/f56w$, $Im\phi/f56m$, or $Im\phi/f56t$ is less than the lower limit defined in one of Conditional Formulae (4A), (4B), and (4C), the height of a marginal axial light ray will increase at the side toward the magnification side from the fourth lens group G4 in the vicinity of the zoom range thereof. Particularly, the diameters of the lenses that constitute the second lens group G2 will increase. Note that here, the marginal axial light rays refer to the lower axial light ray 4 and the upper axial light ray 7 illustrated in FIG. 12.

If the value of $Im\phi/f56w$, $Im\phi/f56m$, or $Im\phi/f56t$ is greater than the upper limit defined in one of Conditional Formulae (4A), (4B), and (4C), the angle formed between a light ray from among light beams of each angle of view, which is an index of telecentric properties, and the optical axis Z will increase. This will result in the height of the outermost light rays of off axis light beams to increase at the first lens group G1, and the diameters of the lenses that constitute the first lens group G1 will increase. Note that here, the light ray which is an index of telecentric properties is a light ray included in a light beam focused at a point on an image surface at the reduction side that bisects the light beam between the maximum ray of light at the upper side and the maximum ray of light at the lower side thereof.

Based on the above circumstances, it is preferable for the projection zoom lens of the present embodiment to satisfy Conditional Formulae (4A'), (4B'), and (4C') below, in order to enable further miniaturization.

$$0.1 < Im\phi/f56w < 0.5 \quad (4A')$$

$$0.1 < Im\phi/f56m < 0.5 \quad (4B')$$

$$0.1 < Im\phi/f56t < 0.5 \quad (4C')$$

It is preferable for the projection zoom lens of the present embodiment to satisfy Conditional Formula (5) below:

$$1.0 < Bf/Im\phi \quad (5)$$

wherein Bf is the back focus of the entire system (air converted distance), and $Im\phi$ is the maximum effective image diameter at the reduction side.

Conditional Formula (5) is for favorably setting the relationship between the back focus and the image circle. If the value of $Bf/Im\phi$ is less than the lower limit defined in Conditional Formula (5), it will become difficult to secure an appropriate space for inserting a glass block or the like as a color combining means, such as a beam splitter, a cross dichroic prism, and a TIR prism at the reduction side of the lens system while obtaining a desired size for the image circle.

It is preferable for the projection zoom lens of the present embodiment to satisfy Conditional Formula (6) below:

$$0.7 < BrG2/Brmx < 3.5 \quad (6)$$

wherein BrG2 is the amount of displacement of the second lens group from the wide angle end to the telephoto end, and Brmx is the maximum value from among the amount of displacement of the third lens group from the wide angle end to the telephoto end, the amount of displacement of the fourth lens group from the wide angle end to the telephoto end, and the amount of displacement of the fifth lens group from the wide angle end to the telephoto end. Note that the sign of the amount of displacement is positive when the position at the telephoto end is more toward the magnification side than the position at the wide angle end, and negative when the position at the telephoto end is more toward the reduction side than the position at the wide angle end.

In lens systems such as the projection zoom lens of the present embodiment, there is a tendency for the second lens group G2 to have the greatest or the second greatest amount of contribution to changes in magnification from among the lens groups that move when changing magnification. Conditional Formula (6) favorably sets the amount of displacement of the lens group that contributes the greatest or the second greatest amount to changes in magnification, to maintain a favorable balance between the second lens group G2 and the other lens groups that move when changing magnification.

If the value of BrG2/Brmx is less than the lower limit defined in Conditional Formula (6), variations in aberrations when changing magnification will increase. If the value of BrG2/Brmx is greater than the upper limit defined in Conditional Formula (6), the total length of the optical system will become excessively long.

Based on the above circumstances, it is more preferable for the projection zoom lens of the present embodiment to satisfy Conditional Formula (6') below, and even more preferable for the projection zoom lens of the present embodiment to satisfy Conditional Formula (6") below, in order to further suppress variations in aberrations when changing magnification and to enable further miniaturization.

$$0.8 < BrG2/Brmx < 2.5 \quad (6')$$

$$0.88 < BrG2/Brmx < 2.5 \quad (6'')$$

It is preferable for the projection zoom lens of the present embodiment to satisfy Conditional Formula (7) below:

$$2\omega t < 25 \quad (7)$$

wherein 2ωt is the maximum full angle of view at the telephoto end.

Conditional Formula (7) determines one of the factors for realizing a projection zoom lens having high versatility. In spaces that have depth, such as a narrow, long conference room, projection type display devices are often fixed in the vicinity of the ceiling at the back of the room, and in such cases, a telephoto type lens is required. If the value of 2ωt is greater than the upper limit defined in Conditional Formula (7), the projection zoom lens will not be able to be used for such telephoto applications.

Based on the above circumstances, it is more preferable for the projection zoom lens of the present embodiment to satisfy Conditional Formula (7') below, in order to enable more favorable use as a telephoto system.

$$2\omega t < 20 \qquad (7')$$

It is preferable for the projection zoom lens of the present embodiment to satisfy Conditional Formula (8) below:

$$1.5 < Zr \qquad (8)$$

wherein Zr is a zoom ratio.

Conditional Formula (8) also determines one of the factors for realizing a projection zoom lens having high versatility. If the value of Zr is less than the lower limit defined in Conditional Formula (8), a high zoom ratio cannot be obtained, the utilizable range of the projection zoom lens becomes narrow, and the versatility thereof will deteriorate.

It is more preferable for the projection zoom lens of the present embodiment to satisfy Conditional Formula (8°) below.

$$1.5 < Zr < 2.2 \qquad (8')$$

If the value of Zr is greater than the upper limit defined in Conditional Formula (8'), the total length of the lens system will become excessively long, and there will be difficulties in configuring the projection zoom lens to be compact. In the case that Conditional Formula (8') is satisfied, it becomes possible to realize miniaturization and versatility.

It is preferable for the projection zoom lens of the present embodiment to satisfy Conditional Formula (9) below:

$$0.4 < f2/fw < 1.1 \qquad (9)$$

wherein f2 is the focal length of the second lens group, and fw is the focal length of the entire system at the wide angle end.

Conditional Formula (9) is for favorably setting the ratio of the refractive power of the second lens group G2, which contributes greatly to changes in magnification, and the refractive power of the entire system. If the value of f2/fw is less than the lower limit defined in Conditional Formula (9), it will be necessary to increase the refractive power of the first lens group G1 in order to achieve a balance in the refractive powers of the lens groups, resulting in the diameters of the lenses that constitute the first lens group G1 becoming great. If the value of f2/fw is greater than the upper limit defined in Conditional Formula (9), the refractive power of the second lens group G2 will become weak, the amount of movement of the second lens group G2 when changing magnification will increase, and the total length of the entire system will become long.

Based on the above circumstances, it is more preferable for Conditional Formula (9') below to be satisfied, in order to achieve further miniaturization.

$$0.55 < f2/fw < 1.1 \qquad (9')$$

It is preferable for the projection zoom lens of the present embodiment to satisfy Conditional Formula (10) below:

$$0.6 < f6/fw < 1.8 \qquad (10)$$

wherein f6 is the focal length of the sixth lens group, and fw is the focal length of the entire system at the wide angle end.

Conditional Formula (10) is for favorably setting the ratio of the refractive power of the sixth lens group G6, which is the lens group provided most toward the reduction side, and the refractive power of the entire system. If the value of f6/fw is less than the lower limit defined in Conditional Formula (10), the balance of the refractive power of the sixth lens group and the refractive powers of the other lens groups will become poor, and it will become necessary to impart the fifth lens group G5, for example, with a strong negative refractive power. This will result in favorable correction of chromatic aberrations and field curvature becoming difficult. If the value of f6/fw is greater than the upper limit defined in Conditional Formula (10), the height of marginal axial light rays at the lens groups toward the magnification side will become high. This will result in the diameters of the lenses that constitute the second lens group G2 in particular to increase, leading to difficulties in realizing a small number and a telephoto system while miniaturizing the diameters of the lenses of the projection zoom lens.

Aberrations can be favorably corrected, an increase in size can be suppressed, and a small F number and a telephoto system can be realized, by the projection zoom lens satisfying Conditional Formula (10). In order to increase the advantageous effects obtained by satisfying Conditional Formula (10), it is more preferable for the projection zoom lens of the present embodiment to satisfy Conditional Formula (10') below.

$$0.8 < f6/fw < 1.6 \qquad (10')$$

Note that in the projection zoom lens which is to be achieved by the present invention, it is favorable for distortion to be suppressed to approximately 2% or less across the entire range of magnification.

In the projection zoom lens of the present embodiment, a configuration in which the lens surfaces are all spherical as in the example illustrated in FIG. 1, that is, a configuration in which no aspherical surfaces are employed, is possible. Such a configuration is advantageous from the viewpoint of cost. It is a matter of course that the projection zoom lens of the present invention may adopt a configuration that employs aspherical surfaces. In such a case, aberrations can be corrected more favorably.

Next, an embodiment of a projection display device of the present invention will be described with reference to FIG. 24. FIG. 24 is a diagram that illustrates the schematic configuration of a projection type display device according to an embodiment of the present invention.

The projection type display device 100 illustrated in FIG. 24 is equipped with: a projection zoom lens 10 according to an embodiment of the present invention; a light source 20; transmissive display elements 11a through 11c that function as light valves corresponding to each of three colors; and an illuminating optical section 30 that guides light beams from the light source 20 to the light valves. The illuminating optical section 30 includes: dichroic mirrors 12 and 13 for separating colors; a cross dichroic prism for combining colors; condenser lenses 16a through 16c, and total reflection mirrors 18a through 18c. Note that the projection zoom lens 10 is schematically illustrated in FIG. 24. In addition, although not illustrated in FIG. 24, an integrator such as a fly eye lens is provided between the light source 20 and the dichroic mirror 12.

White light output by the light source 20 is separated into three colored light beams (G light, B light, and R light) by the dichroic mirrors 12 and 13 of the illuminating optical section 30. The optical paths of the three colored light beams are respectively deflected by the total reflection mirrors 18a through 18c. The three colored light beams are optically modulated by entering the transmissive display elements 11a through 11c corresponding to each colored light beam via the condenser lenses 16a through 16c. The colored light beams are combined by the cross dichroic prism 14, and enter the projection zoom lens 10. The projection zoom lens 10 projects an optical image formed by light which has been optically modulated by the transmissive display elements 11a through 11c onto a screen (not shown).

Transmissive liquid crystal display elements, for example, may be employed as the transmissive display elements 11a through 11c. Note that FIG. 24 illustrates an example in which transmissive display elements are employed as the light valves. However, the light valves to be employed in the projection type display device of the present invention are not limited to transmissive display elements. Other light modulating means, such as reflective liquid crystal display elements and DMD's may be employed as the light valves.

Next, specific examples of the projection zoom lens of the present invention will be described.

EXAMPLE 1

The lens configuration of a projection zoom lens of Example 1 is illustrated in FIG. 1. Because a description has already been given regarding FIG. 1, redundant descriptions will be omitted here. The configurations illustrated in FIG. 1 are those in which projection distances are infinitely far.

The projection zoom lens of Example 1 has a six group configuration, in which the first lens group G1 having a refractive negative power, the second lens group G2 having a positive refractive power, the third lens group G3 having a negative refractive power, a fourth lens group G4 having a positive refractive power, the fifth lens group G5 having a negative refractive power, and the sixth lens group G6 having a positive refractive power, in this order from the magnification side, and the reduction side is telecentric. A glass block 2 that functions as various filters such as an infrared ray cutoff filter and a low pass filter, or as a color combining prism, etc., is provided toward the reduction side of the sixth lens group G6, and an image display surface 1 of the light valve is provided so as to contact the surface of the glass block 2 toward the reduction side.

When changing magnification, the first lens group G1 and the sixth lens group G6 are fixed and the second lens group G2, the third lens group G3, the fourth lens group G4, and the fifth lens group G5 move. The manners of movement of the lens groups that move are schematically indicated by the arrows in FIG. 1. The projection zoom lens of Example 1 is configured such that the second lens group G2 moves toward the magnification side when changing magnification from the wide angle end to the telephoto end.

The first lens group G1 is constituted by the first lens L1, which is a biconvex lens, the second lens L2, which is a negative meniscus lens having a concave surface toward the reduction side, the third lens L3, which is a biconcave lens, in this order from the magnification side.

The second lens group G2 is constituted by the fourth lens L4, which is a biconvex lens, the fifth lens L5, which is a biconvex lens, the sixth lens L6, which is a biconcave lens, in this order from the magnification side. The fifth lens L5 and the sixth lens L6 are cemented together.

The third lens group G3 is constituted by the seventh lens L7, which is a negative meniscus lens having a concave surface toward the reduction side, and the eighth lens L8, which is a negative meniscus lens having a concave surface toward the magnification side, in this order from the magnification side.

The fourth lens group G4 is constituted by the ninth lens L9, which is a biconvex lens, the tenth lens L10, which is a biconvex lens, and the eleventh lens L11, which is a negative meniscus lens having a concave surface toward the magnification side, in this order from the magnification side. The tenth lens L10 and the eleventh lens L11 are cemented together.

The fifth lens group G5 is constituted by the twelfth lens L12, which is a negative meniscus lens having a concave surface toward the reduction side, the thirteenth lens L13, which is a biconcave lens, the fourteenth lens L14, which is a biconvex lens, in this order from the magnification side. The thirteenth lens L13 and the fourteenth lens L14 are cemented together.

The sixth lens group G6 is constituted only by the fifteenth lens L15, which is a biconvex lens.

(A) of Table 1 shows basic lens data of the projection zoom lens of Example 1. In the basic lens data, ith (i=1, 2, 3, . . . ) lens surface numbers that sequentially increase from the magnification side to the reduction side, with the lens surface at the most object side designated as first, are shown in the column Si. The radii of curvature of ith surfaces are shown in the column Ri, the distances between an ith surface and an i+1st surface along the optical axis Z are shown in the column Di. The refractive indices of jth (j=1, 2, 3, . . . ) constituent elements that sequentially increase from the magnification side to the reduction side, with the lens at the most magnification side designated as first, with respect to the d line (wavelength: 587.6 nm) are shown in the column Ndj. The Abbe's numbers of the jth constituent elements with respect to the d line are shown in the column vdj.

Note that the signs of the radii of curvature are positive in cases that the surface shape is convex toward the object side, and negative in cases that the surface shape is convex toward the image side. The glass block 2 is also shown in the basic lens data. The distance between the first lens group G1 and the second lens group G2, the distance between the second lens group G2 and the third lens group G3, the distance between the third lens group G3 and the fourth lens group G4, the distance between the fourth lens group G4 and the fifth lens group G5, and the distance between the fifth lens group G5 and the sixth lens group G6 change when changing magnification. DD[6], DD[11], DD[15], DD[20], and DD[25] are respectively shown in the columns of the distances between surfaces corresponding to these distances.

(B) of Table 1 shows the values of zoom magnification rates (zoom ratios), the focal length f' of the entire system, the back focus Bf (air converted distance), the F number (FNo.), and the full angle of view 26) at the wide angle end, at the intermediate focal length, and at the telephoto end as items related to the d line of the projection zoom lens of Example 1.

(C) of Table 1 shows the values of the distances between the surfaces DD[6], DD[6], DD[11], DD[15], DD[20], and DD[25] in the projection zoom lens of Example 1 at the wide angle end, at the intermediate focal length, and at the telephoto end, as zoom distances of the projection zoom lens of Example 1.

Note that the numerical values shown in Table 1 are those which are normalized such that the focal distance of the entire system at the wide angle end is 1, and the projection distance is infinitely far. In addition, the numerical values of the tables are rounded off at a predetermined number of digits.

TABLE 1

(A) Example 1: Lens Data

| Si | Ri | Di | Ndj | νdj |
|---|---|---|---|---|
| 1 | 4.6017 | 0.1165 | 1.80518 | 25.42 |
| 2 | −5.6641 | 0.0626 | | |
| 3 | 7.7234 | 0.0409 | 1.49700 | 81.61 |
| 4 | 0.9738 | 0.2088 | | |
| 5 | −1.5001 | 0.0387 | 1.66680 | 33.05 |
| 6 | 3.1154 | DD[6] | | |
| 7 | 2.8057 | 0.1650 | 1.77250 | 49.60 |
| 8 | −2.1564 | 0.0043 | | |
| 9 | 1.1971 | 0.2299 | 1.61800 | 63.33 |
| 10 | −1.9137 | 0.0398 | 1.78472 | 25.68 |
| 11 | 8.4655 | DD[11] | | |
| 12 | 0.9333 | 0.1951 | 1.60311 | 60.64 |
| 13 | 0.5644 | 0.1931 | | |
| 14 | −0.9834 | 0.0301 | 1.61340 | 44.27 |
| 15 | −6.4588 | DD[15] | | |
| 16 | 7.0306 | 0.0940 | 1.80809 | 22.76 |
| 17 | −2.0842 | 0.0043 | | |
| 18 | 0.9543 | 0.1959 | 1.49700 | 81.61 |
| 19 | −1.5681 | 0.0366 | 1.51742 | 52.43 |
| 20 | −6.8326 | DD[20] | | |
| 21 | 1.8482 | 0.0534 | 1.51742 | 52.43 |
| 22 | 0.5759 | 0.3077 | | |
| 23 | −0.7127 | 0.0292 | 1.78472 | 25.68 |
| 24 | 1.4817 | 0.1733 | 1.72916 | 54.68 |
| 25 | −0.8505 | DD[25] | | |
| 26 | 1.2070 | 0.1206 | 1.77250 | 49.60 |
| 27 | −6.0440 | 0.3443 | | |
| 28 | ∞ | 0.6235 | 1.51633 | 64.14 |
| 29 | ∞ | | | |

| | Wide Angle | Intermediate | Telephoto |
|---|---|---|---|
| (B) Example 1: Items (d line) | | | |
| Zoom Ratio | 1.000 | 1.304 | 1.700 |
| f | 1.000 | 1.304 | 1.700 |
| Bf | 0.756 | 0.756 | 0.756 |
| FNo. | 1.70 | 1.85 | 2.00 |
| 2ω[°] | 32.5 | 25.2 | 19.3 |
| (C) Example 1: Zoom Distances | | | |
| DD[6] | 0.7224 | 0.4319 | 0.1836 |
| DD[11] | 0.0109 | 0.1616 | 0.4729 |
| DD[15] | 0.6294 | 0.5297 | 0.4212 |
| DD[20] | 0.0407 | 0.1236 | 0.2648 |
| DD[25] | 0.0108 | 0.1674 | 0.0716 |

All of the lens surfaces of the projection zoom lens of Example 1 are spherical surfaces, and no lenses having aspherical surfaces are employed. Therefore, the projection zoom lens of Example 1 is advantageous from the viewpoint of cost.

The spherical aberration, the astigmatic aberration, the distortion, and the lateral chromatic aberration of the projection zoom lens of Example 1 at the wide angle end are illustrated in A through D of FIG. 13, respectively. The spherical aberration, the astigmatic aberration, the distortion, and the lateral chromatic aberration of the projection zoom lens of Example 1 at the intermediate position are illustrated in E through H of FIG. 13, respectively. The spherical aberration, the astigmatic aberration, the distortion, and the lateral chromatic aberration of the projection zoom lens of Example 1 at the telephoto end are illustrated in I through L of FIG. 13, respectively.

Each of A through L of FIG. 13, which are diagrams that illustrate the aberrations, use the d line (wavelength: 587.6 nm) as a standard. However, aberrations related to the F line (wavelength: 486.1 nm) and the C line (wavelength: 656.3 nm) are also shown in the diagrams that illustrate spherical aberration. In addition, the diagrams that illustrate lateral chromatic aberration also show aberrations related to the F line and the C line. In the diagrams that illustrate astigmatic aberrations, aberrations in the sagittal direction are indicated by solid lines denoted by (S), while aberrations in the tangential direction are indicated by broken lines denoted by (T). In the diagrams that illustrate spherical aberrations, "Fno." denotes F numbers. In the other diagrams that illustrate the aberrations, ω denotes half angles of view. Note that the diagrams of A through L of FIG. 13 illustrate aberrations when the reduction ratio is −0.008x.

Note that values of the projection zoom lens of Example 1 related to values corresponding to Conditional Formulae (1), (2), (3A), (3B), (3C), (4A), (4B), (4C), and (5) through (10) are shown in Table 12, along with those of projection zoom lenses of Examples 2 through 11.

The points regarding the symbols that represent each item of data, the meanings thereof, the manners in which they are shown, that the numerical values are normalized such that the focal distance of the entire system at the wide angle end is 1, that the numerical values of the lens data are for when the projection distance is infinitely far, and that the diagrams that illustrate aberrations are those for when the reduction ratio is −0.008x apply to Examples 2 through 11 to be described below, unless otherwise noted.

EXAMPLE 2

FIG. 2 illustrates the configurations of lens groups and the trajectories of rays of light through a projection zoom lens of Example 2 at the wide angle end, the intermediate focal length state, and the telephoto end. The projection zoom lens of Example 2 has approximately the same configuration as the projection zoom lens of Example 1, except that a fourth lens group G4 is constituted by a ninth lens L9, which is a biconvex lens, and a tenth lens L10, which is a biconvex lens, in this order from the magnification side, that a fifth lens group G5 is constituted by an eleventh lens L11, which is a biconvex lens, a twelfth lens L12, which is a biconcave lens, a thirteenth lens L13, which is a biconcave lens, a fourteenth lens L14, which is a biconvex lens, in this order from the magnification side, that the eleventh lens L11 and the twelfth lens L12 are cemented together, and that the thirteenth lens L13 and the fourteenth lens L14 are cemented together.

Basic lens data, items related to the d line, and zoom distances of the projection zoom lens of Example 2 are shown in (A) through (C) of Table 2. DD[6], DD[11], DD[15], DD[19], and DD[25] are respectively shown in the column of distances, for distances between surfaces that move when changing magnification in (A) of Table 2, and the values corresponding thereto are shown in (C) of Table 2. A through L of FIG. 14 illustrate various aberrations of the projection zoom lens of Example 2.

TABLE 2

(A) Example 2: Lens Data

| Si | Ri | Di | Ndj | νdj |
|---|---|---|---|---|
| 1 | 6.1141 | 0.1106 | 1.80000 | 29.84 |
| 2 | −5.9605 | 0.1609 | | |

TABLE 2-continued

| | | | | |
|---|---|---|---|---|
| 3 | 6.9922 | 0.0408 | 1.49700 | 81.61 |
| 4 | 0.9641 | 0.2022 | | |
| 5 | −1.4778 | 0.0387 | 1.62004 | 36.26 |
| 6 | 3.1251 | DD[6] | | |
| 7 | 2.4381 | 0.1585 | 1.77250 | 49.60 |
| 8 | −2.2262 | 0.0043 | | |
| 9 | 1.1233 | 0.2257 | 1.61800 | 63.33 |
| 10 | −1.9287 | 0.0397 | 1.78470 | 26.29 |
| 11 | 7.0828 | DD[11] | | |
| 12 | 0.9626 | 0.1293 | 1.51633 | 64.14 |
| 13 | 0.5559 | 0.1783 | | |
| 14 | −0.9978 | 0.0301 | 1.58267 | 46.42 |
| 15 | −5.9737 | DD[15] | | |
| 16 | 8.7854 | 0.0844 | 1.80809 | 22.76 |
| 17 | −2.3580 | 0.0825 | | |
| 18 | 0.9649 | 0.1531 | 1.49700 | 81.61 |
| 19 | −10.9529 | DD[19] | | |
| 20 | 1.9557 | 0.1031 | 1.67790 | 55.34 |
| 21 | −2.3178 | 0.0258 | 1.51742 | 52.43 |
| 22 | 0.5626 | 0.2732 | | |
| 23 | −0.7028 | 0.0640 | 1.74077 | 27.79 |
| 24 | 1.1915 | 0.1888 | 1.61800 | 63.33 |
| 25 | −0.7981 | DD[25] | | |
| 26 | 1.1023 | 0.1236 | 1.77250 | 49.60 |
| 27 | −8.8006 | 0.3568 | | |
| 28 | ∞ | 0.6230 | 1.51633 | 64.14 |
| 29 | ∞ | | | |

| | Wide Angle | Intermediate | Telephoto |
|---|---|---|---|
| (B) Example 2: Items (d line) | | | |
| Zoom Ratio | 1.000 | 1.304 | 1.700 |
| f | 1.000 | 1.304 | 1.700 |
| Bf | 0.768 | 0.768 | 0.768 |
| FNo. | 1.70 | 1.85 | 1.99 |
| 2ω[°] | 32.4 | 25.2 | 19.3 |
| (C) Example 2: Zoom Distances | | | |
| DD[6] | 0.6912 | 0.4063 | 0.1559 |
| DD[11] | 0.0109 | 0.1412 | 0.4088 |
| DD[15] | 0.6065 | 0.5087 | 0.4235 |
| DD[19] | 0.0133 | 0.1087 | 0.2694 |
| DD[25] | 0.0108 | 0.1678 | 0.0751 |

EXAMPLE 3

FIG. 3 illustrates the configurations of lens groups and the trajectories of rays of light through a projection zoom lens of Example 3 at the wide angle end, the intermediate focal length state, and the telephoto end. The projection zoom lens of Example 3 has approximately the same configuration as the projection zoom lens of Example 1, except that a third lens group G3 is constituted by a seventh lens L7, which is a positive meniscus lens having a concave surface toward the reduction side, an eighth lens L8, which is a negative meniscus lens having a concave surface toward the reduction side, and a ninth lens L9, which is a negative meniscus lens having a concave surface toward the magnification side, in this order from the magnification side, and that a fourth lens group G4 is constituted by a tenth lens L10, which is a biconvex lens, and an eleventh lens L11, which is a biconvex lens, in this order from the magnification side.

Basic lens data, items related to the d line, and zoom distances of the projection zoom lens of Example 3 are shown in (A) through (C) of Table 3. DD[6], DD[11], DD[17], DD[21], and DD[26] are respectively shown in the column of distances, for distances between surfaces that move when changing magnification in (A) of Table 3, and the values corresponding thereto are shown in (C) of Table 3. A through L of FIG. 15 illustrate various aberrations of the projection zoom lens of Example 3.

TABLE 3

| (A) Example 3: Lens Data | | | | |
|---|---|---|---|---|
| Si | Ri | Di | Ndj | νdj |
| 1 | 4.9061 | 0.1199 | 1.80000 | 29.84 |
| 2 | −6.4490 | 0.1456 | | |
| 3 | 6.7063 | 0.0408 | 1.49700 | 81.61 |
| 4 | 0.9373 | 0.2138 | | |
| 5 | −1.4738 | 0.0387 | 1.63980 | 34.46 |
| 6 | 3.1127 | DD[6] | | |
| 7 | 2.5885 | 0.1606 | 1.77250 | 49.60 |
| 8 | −2.1635 | 0.0043 | | |
| 9 | 1.1169 | 0.2316 | 1.61800 | 63.33 |
| 10 | −1.8419 | 0.0398 | 1.75520 | 27.51 |
| 11 | 5.9409 | DD[11] | | |
| 12 | 1.1153 | 0.1003 | 1.78590 | 44.20 |
| 13 | 2.8660 | 0.0100 | | |
| 14 | 4.2532 | 0.0463 | 1.51742 | 52.43 |
| 15 | 0.5471 | 0.1817 | | |
| 16 | −1.0696 | 0.0301 | 1.70154 | 41.24 |
| 17 | −6.3656 | DD[17] | | |
| 18 | 10.5946 | 0.0868 | 1.80809 | 22.76 |
| 19 | −2.0337 | 0.0642 | | |
| 20 | 0.9453 | 0.2148 | 1.49700 | 81.61 |
| 21 | −7.8730 | DD[21] | | |
| 22 | 1.6706 | 0.0471 | 1.51742 | 52.43 |
| 23 | 0.5839 | 0.2592 | | |
| 24 | −0.7680 | 0.0292 | 1.78470 | 26.29 |
| 25 | 1.1979 | 0.1758 | 1.72916 | 54.68 |
| 26 | −0.8943 | DD[26] | | |
| 27 | 1.1561 | 0.1201 | 1.77250 | 49.60 |
| 28 | −7.4299 | 0.3421 | | |
| 29 | ∞ | 0.6230 | 1.51633 | 64.14 |
| 30 | ∞ | | | |

| | Wide Angle | Intermediate | Telephoto |
|---|---|---|---|
| (B) Example 3: Items (d line) | | | |
| Zoom Ratio | 1.000 | 1.304 | 1.700 |
| f | 1.000 | 1.304 | 1.700 |
| Bf | 0.753 | 0.753 | 0.753 |
| Fno. | 1.70 | 1.85 | 2.00 |
| 2ω[°] | 32.4 | 25.2 | 19.3 |
| (C) Example 3: Zoom Distances | | | |
| DD[6] | 0.6657 | 0.3842 | 0.1445 |
| DD[11] | 0.0121 | 0.1518 | 0.4562 |
| DD[17] | 0.5933 | 0.4969 | 0.4002 |
| DD[21] | 0.0357 | 0.1307 | 0.2881 |
| DD[26] | 0.0828 | 0.2260 | 0.1007 |

EXAMPLE 4

FIG. 4 illustrates the configurations of lens groups and the trajectories of rays of light through a projection zoom lens of Example 4 at the wide angle end, the intermediate focal length state, and the telephoto end. The projection zoom lens of Example 4 has approximately the same configuration as the projection zoom lens of Example 1, except that a second lens group G2 is constituted by a fourth lens L4, which is a negative meniscus lens having a concave surface toward the reduction side, a fifth lens L5, which is a biconvex lens, and a sixth lens L6, which is a positive meniscus lens having a concave surface toward the reduction side, provided in this order from the magnification side, that the fourth lens L4 and the fifth lens L5 are cemented together, that a third lens group G3 is constituted by a seventh lens L7, which is a biconvex lens, an eighth lens L8, which is a biconcave lens, and a ninth lens L9, which is a negative meniscus lens having a concave surface toward the magnification side, in this order from the magnification side, that the seventh lens L7 and the eighth lens L8 are cemented together, and that a fourth lens group G4 is constituted by a tenth lens L10, which is a biconvex lens, and an eleventh lens L11, which is a biconvex lens, in this order from the magnification side.

Basic lens data, items related to the d line, and zoom distances of the projection zoom lens of Example 4 are shown in (A) through (C) of Table 4. DD[6], DD[11], DD[16], DD[20], and DD[25] are respectively shown in the column of distances, for distances between surfaces that move when changing magnification in (A) of Table 4, and the values corresponding thereto are shown in (C) of Table 4. A through L of FIG. 16 illustrate various aberrations of the projection zoom lens of Example 4.

TABLE 4

(A) Example 4: Lens Data

| Si | Ri | Di | Ndj | vdj |
|---|---|---|---|---|
| 1 | 3.3780 | 0.1308 | 1.80100 | 34.97 |
| 2 | −14.5055 | 0.2517 | | |
| 3 | 7.3990 | 0.0407 | 1.48749 | 70.23 |
| 4 | 0.8386 | 0.2344 | | |
| 5 | −1.8291 | 0.0386 | 1.83400 | 37.16 |
| 6 | 8.3972 | DD[6] | | |
| 7 | 3.0928 | 0.0404 | 1.80518 | 25.42 |
| 8 | 0.9880 | 0.2327 | 1.77250 | 49.60 |
| 9 | −2.6054 | 0.0043 | | |
| 10 | 1.1570 | 0.1303 | 1.61800 | 63.33 |
| 11 | 5.8673 | DD[11] | | |
| 12 | 0.8370 | 0.2360 | 1.66680 | 33.05 |
| 13 | −1.2583 | 0.0322 | 1.65412 | 39.68 |
| 14 | 0.5188 | 0.1559 | | |
| 15 | −1.0458 | 0.0300 | 1.60342 | 38.03 |
| 16 | −24.6470 | DD[16] | | |
| 17 | 14.0362 | 0.0850 | 1.80518 | 25.42 |
| 18 | −1.9729 | 0.0517 | | |
| 19 | 0.8783 | 0.1813 | 1.49700 | 81.61 |
| 20 | −11.3473 | DD[20] | | |
| 21 | 1.4794 | 0.0257 | 1.51742 | 52.43 |
| 22 | 0.5758 | 0.1867 | | |
| 23 | −0.6942 | 0.0291 | 1.75520 | 27.51 |
| 24 | 1.2296 | 0.1828 | 1.72916 | 54.68 |
| 25 | −0.8469 | DD[25] | | |
| 26 | 1.2047 | 0.1180 | 1.77250 | 49.60 |
| 27 | −6.8317 | 0.3430 | | |
| 28 | ∞ | 0.6216 | 1.51633 | 64.14 |
| 29 | ∞ | | | |

| | Wide Angle | Intermediate | Telephoto |
|---|---|---|---|
| (B) Example 4: Items (d line) | | | |
| Zoom Ratio | 1.000 | 1.304 | 1.700 |
| f | 1.000 | 1.304 | 1.700 |
| Bf | 0.753 | 0.753 | 0.753 |
| FNo. | 1.70 | 1.87 | 2.00 |
| 2ω[°] | 32.4 | 25.1 | 19.3 |
| (C) Example 4: Zoom Distances | | | |
| DD[6] | 0.6835 | 0.3870 | 0.1284 |
| DD[11] | 0.0108 | 0.1457 | 0.4334 |
| DD[16] | 0.4921 | 0.4080 | 0.3215 |
| DD[20] | 0.0391 | 0.1272 | 0.2884 |
| DD[25] | 0.0749 | 0.2326 | 0.1286 |

EXAMPLE 5

FIG. 5 illustrates the configurations of lens groups and the trajectories of rays of light through a projection zoom lens of Example 5 at the wide angle end, the intermediate focal length state, and the telephoto end. The signs of the refractive powers of each of a first lens group G1 through a sixth lens group G6, the lens groups that remain fixed when changing magnification, and the lens groups that move when changing magnification are the same as those of the projection zoom lens of Example 1. However, the lens configurations of each of the lens groups differ from those of Example 1, as will be described below.

The first lens group G1 is constituted by a first lens L1, which is a biconvex lens, a second lens L2, which is a negative meniscus lens having a concave surface toward the reduction side, a third lens L3, which is a biconcave lens, and a fourth lens L4, which is a positive meniscus lens having a concave surface toward the reduction side, in this order from the magnification side. The third lens L3 and the fourth lens L4 are cemented together.

The second lens group G2 is constituted by a fifth lens L5, which is a negative meniscus lens having a concave surface toward the reduction side, a sixth lens L6, which is a biconvex lens, and a seventh lens L7, which is a biconvex lens, in this order from the magnification side. The fifth lens L5 and the sixth lens L6 are cemented together.

The third lens group L3 is constituted by an eighth lens L8, which is a positive meniscus lens having a concave surface toward the reduction side, and a ninth lens L9, which is a negative meniscus lens having a concave surface toward the reduction side, in this order from the magnification side. The fourth lens group G4 is constituted by a tenth lens L10, which is a negative meniscus lens having a concave surface toward the magnification side, and an eleventh lens L11, which is a biconvex lens, in this order from the magnification side.

The fifth lens group G5 is constituted by a twelfth lens L12, which is a biconcave lens, and a thirteenth lens L13, which is a biconvex lens, in this order from the magnification side. The sixth lens group G6 is constituted only by a fourteenth lens L14, which is a biconvex lens.

Basic lens data, items related to the d line, and zoom distances of the projection zoom lens of Example 5 are shown in (A) through (C) of Table 5. DD[7], DD[12], DD[16], DD[20], and DD[24] are respectively shown in the column of distances, for distances between surfaces that move when changing magnification in (A) of Table 5, and the values corresponding thereto are shown in (C) of Table 5. A through L of FIG. 17 illustrate various aberrations of the projection zoom lens of Example 5.

TABLE 5

(A) Example 5: Lens Data

| Si | Ri | Di | Ndj | vdj |
|---|---|---|---|---|
| 1 | 1.2633 | 0.1084 | 1.71300 | 53.87 |
| 2 | −10.4974 | 0.1354 | | |
| 3 | 1.9906 | 0.0406 | 1.49700 | 81.54 |
| 4 | 0.8750 | 0.1815 | | |
| 5 | −1.0952 | 0.0272 | 1.74320 | 49.34 |
| 6 | 0.6091 | 0.0523 | 1.80518 | 25.42 |
| 7 | 1.2250 | DD[7] | | |
| 8 | 1.0884 | 0.0227 | 1.80518 | 25.42 |
| 9 | 0.5404 | 0.1178 | 1.61800 | 63.33 |
| 10 | −2.5711 | 0.0018 | | |
| 11 | 0.5761 | 0.1079 | 1.49700 | 81.54 |
| 12 | −2.1995 | DD[12] | | |
| 13 | 0.4000 | 0.0573 | 1.67003 | 47.23 |
| 14 | 0.4930 | 0.0351 | | |
| 15 | 1.3300 | 0.0216 | 1.58144 | 40.75 |
| 16 | 0.3267 | DD[16] | | |
| 17 | −0.3477 | 0.0181 | 1.54814 | 45.79 |
| 18 | −29.3020 | 0.0450 | | |
| 19 | 3.6496 | 0.0556 | 1.80100 | 34.97 |
| 20 | −0.5268 | DD[20] | | |
| 21 | −0.3358 | 0.0235 | 1.60342 | 38.03 |
| 22 | 1.3002 | 0.0402 | | |
| 23 | 1.7202 | 0.1096 | 1.62041 | 60.29 |
| 24 | −0.4595 | DD[24] | | |
| 25 | 0.8660 | 0.0593 | 1.71300 | 53.87 |

TABLE 5-continued

| 26 | −31.2680 | 0.1531 | | |
| 27 | ∞ | 0.4269 | 1.51633 | 64.14 |
| 28 | ∞ | | | |

| | Wide Angle | Intermediate | Telephoto |
|---|---|---|---|
| (B) Example 5: Items (d line) | | | |
| Zoom Ratio | 1.000 | 1.304 | 1.700 |
| f | 1.000 | 1.304 | 1.700 |
| Bf | 0.435 | 0.435 | 0.435 |
| FNo. | 2.20 | 2.47 | 2.73 |
| 2ω[°] | 22.2 | 17.0 | 13.0 |
| (C) Example 5: Zoom Distances | | | |
| DD[7] | 0.5123 | 0.2655 | 0.0411 |
| DD[12] | 0.0099 | 0.0417 | 0.1517 |
| DD[16] | 0.1864 | 0.1888 | 0.1371 |
| DD[20] | 0.3403 | 0.3052 | 0.1679 |
| DD[24] | 0.0101 | 0.2577 | 0.5612 |

EXAMPLE 6

FIG. 6 illustrates the configurations of lens groups and the trajectories of rays of light through a projection zoom lens of Example 6 at the wide angle end, the intermediate focal length state, and the telephoto end. The signs of the refractive powers of each of a first lens group G1 through a sixth lens group G6, the lens groups that remain fixed when changing magnification, and the lens groups that move when changing magnification are the same as those of the projection zoom lens of Example 1. However, the lens configurations of each of the lens groups differ from those of Example 1, as will be described below.

The first lens group G1 is constituted by a first lens L1, which is a biconvex lens, a second lens L2, which is a biconcave lens, a third lens L3, which is a biconvex lens, a fourth lens L4, which is a biconcave lens, and a fifth lens L5, which is a positive meniscus lens having a concave surface toward the reduction side, in this order from the magnification side. The fourth lens L4 and the fifth lens L5 are cemented together.

The second lens group G2 is constituted by a sixth lens L6, which is a negative meniscus lens having a concave surface toward the reduction side, a seventh lens L7, which is a biconvex lens, and an eighth lens L8, which is a biconvex lens, in this order from the magnification side. The sixth lens L6 and the seventh lens L7 are cemented together.

The third lens group L3 is constituted by a ninth lens L9, which is a positive meniscus lens having a concave surface toward the reduction side, and a tenth lens L10, which is a negative meniscus lens having a concave surface toward the reduction side, in this order from the magnification side. The fourth lens group G4 is constituted by an eleventh lens L11, which is a biconvex lens, and a twelfth lens L12, which is a biconcave lens, in this order from the magnification side.

The fifth lens group G5 is constituted by a thirteenth lens L13, which is a biconcave lens, and a fourteenth lens L14, which is a biconvex lens, in this order from the magnification side. The sixth lens group G6 is constituted only by a fifteenth lens L15, which is a biconvex lens.

Basic lens data, items related to the d line, and zoom distances of the projection zoom lens of Example 6 are shown in (A) through (C) of Table 6. DD[9], DD[14], DD[18], DD[22], and DD[26] are respectively shown in the column of distances, for distances between surfaces that move when changing magnification in (A) of Table 6, and the values corresponding thereto are shown in (C) of Table 6. A through L of FIG. 18 illustrate various aberrations of the projection zoom lens of Example 6.

TABLE 6

(A) Example 6: Lens Data

| Si | Ri | Di | Ndj | vdj |
|---|---|---|---|---|
| 1 | 2.2285 | 0.1070 | 1.72342 | 37.95 |
| 2 | −23.7984 | 0.3925 | | |
| 3 | −15.5977 | 0.0408 | 1.49700 | 81.54 |
| 4 | 1.0422 | 0.2685 | | |
| 5 | 3.6444 | 0.0552 | 1.58913 | 61.14 |
| 6 | −7.5053 | 0.0492 | | |
| 7 | −1.3709 | 0.0427 | 1.72047 | 34.71 |
| 8 | 0.6475 | 0.0619 | 1.75520 | 27.51 |
| 9 | 3.0062 | DD[9] | | |
| 10 | 4.1742 | 0.0281 | 1.64769 | 33.79 |
| 11 | 0.6615 | 0.1271 | 1.49700 | 81.54 |
| 12 | −1.9792 | 0.0028 | | |
| 13 | 0.7586 | 0.1113 | 1.58913 | 61.14 |
| 14 | −4.4004 | DD[14] | | |
| 15 | 0.6816 | 0.0638 | 1.69680 | 55.53 |
| 16 | 0.8205 | 0.0207 | | |
| 17 | 1.2045 | 0.0486 | 1.51742 | 52.43 |
| 18 | 0.4353 | DD[18] | | |
| 19 | 0.5136 | 0.1439 | 1.77250 | 49.60 |
| 20 | −7.0378 | 0.0049 | | |
| 21 | −4.2290 | 0.0336 | 1.51742 | 52.43 |
| 22 | 0.3983 | DD[22] | | |
| 23 | −0.4797 | 0.0342 | 1.53172 | 48.84 |
| 24 | 0.6889 | 0.0687 | | |
| 25 | 0.9798 | 0.1648 | 1.49700 | 81.54 |
| 26 | −0.5838 | DD[26] | | |
| 27 | 1.2248 | 0.0975 | 1.77250 | 49.60 |
| 28 | −3.9486 | 0.2649 | | |
| 29 | ∞ | 0.4178 | 1.51633 | 64.14 |
| 30 | ∞ | | | |

| | Wide Angle | Intermediate | Telephoto |
|---|---|---|---|
| (B) Example 6: Items (d line) | | | |
| Zoom Ratio | 1.000 | 1.304 | 1.700 |
| f | 1.000 | 1.304 | 1.700 |
| Bf | 0.540 | 0.540 | 0.540 |
| FNo. | 2.20 | 2.51 | 3.02 |
| 2ω[°] | 24.4 | 18.7 | 14.3 |
| (C) Example 6: Zoom Distances | | | |
| DD[9] | 0.6084 | 0.3068 | 0.0445 |
| DD[14] | 0.0774 | 0.0944 | 0.0219 |
| DD[18] | 0.0589 | 0.1543 | 0.3420 |
| DD[22] | 0.1455 | 0.1773 | 0.5124 |
| DD[26] | 0.0920 | 0.2494 | 0.0613 |

EXAMPLE 7

FIG. 7 illustrates the configurations of lens groups and the trajectories of rays of light through a projection zoom lens of Example 7 at the wide angle end, the intermediate focal length state, and the telephoto end. A fifth lens group G5 of the projection zoom lens of Example 7 has a positive refractive power. However, the signs of the refractive powers of a first lens group G1 through a fourth lens group G4 and a sixth lens group G6, the lens groups that remain fixed when changing magnification, and the lens groups that move when changing magnification are the same as those of the projection zoom lens of Example 1. Note that the lens configurations of each of the lens groups differ from those of Example 1, as will be described below.

The first lens group G1 is constituted by a first lens L1, which is a biconvex lens, a second lens L2, which is a biconcave lens, a third lens L3, which is a positive meniscus lens having a concave surface toward the magnification side, a fourth lens L4, which is a biconcave lens, and a fifth lens L5, which is a biconvex lens, in this order from the magnification side. The fourth lens L4 and the fifth lens L5 are cemented together.

The second lens group G2 is constituted by a sixth lens L6, which is a negative meniscus lens having a concave surface toward the reduction side, a seventh lens L7, which is a biconvex lens, and an eighth lens L8, which is a biconvex lens, in this order from the magnification side. The sixth lens L6 and the seventh lens L7 are cemented together.

The third lens group L3 is constituted only by a ninth lens L9, which is a negative meniscus lens having a concave surface toward the reduction side. The fourth lens group G4 is constituted only by a tenth lens L10, which is a positive meniscus lens having a concave surface toward the reduction side.

The fifth lens group G5 is constituted by an eleventh lens L11, which is a biconcave lens, a twelfth lens L12, which is a biconvex lens, a thirteenth lens L13, which is a biconcave lens, and a fourteenth lens L14, which is a biconvex lens, in this order from the magnification side. The thirteenth lens L13 and the fourteenth lens L14 are cemented together. The sixth lens group G6 is constituted only by a fifteenth lens L15, which is a biconvex lens.

Basic lens data, items related to the d line, and zoom distances of the projection zoom lens of Example 7 are shown in (A) through (C) of Table 7. DD[9], DD[14], DD[16], DD[18], and DD[25] are respectively shown in the column of distances, for distances between surfaces that move when changing magnification in (A) of Table 7, and the values corresponding thereto are shown in (C) of Table 7. A through L of FIG. 19 illustrate various aberrations of the projection zoom lens of Example 7.

TABLE 7

(A) Example 7: Lens Data

| Si | Ri | Di | Ndj | vdj |
|---|---|---|---|---|
| 1 | 1.6501 | 0.0902 | 1.72342 | 37.95 |
| 2 | −29.4238 | 0.2951 | | |
| 3 | −16.4860 | 0.0351 | 1.49700 | 81.54 |
| 4 | 0.6847 | 0.0701 | | |
| 5 | −2.8190 | 0.0566 | 1.58913 | 61.14 |
| 6 | −1.1005 | 0.0536 | | |
| 7 | −0.8682 | 0.0352 | 1.72047 | 34.71 |
| 8 | 0.8556 | 0.0669 | 1.75520 | 27.51 |
| 9 | −58.9959 | DD[9] | | |
| 10 | 1.7739 | 0.0282 | 1.69895 | 30.13 |
| 11 | 0.6526 | 0.1071 | 1.49700 | 81.54 |
| 12 | −3.9237 | 0.0028 | | |
| 13 | 0.8556 | 0.0994 | 1.58913 | 61.14 |
| 14 | −2.3755 | DD[14] | | |
| 15 | 0.7316 | 0.0558 | 1.51742 | 52.43 |
| 16 | 0.4416 | DD[16] | | |
| 17 | 0.4276 | 0.1126 | 1.69680 | 55.53 |
| 18 | 0.4648 | DD[18] | | |
| 19 | −0.5336 | 0.0351 | 1.51742 | 52.43 |
| 20 | 0.6630 | 0.1016 | | |
| 21 | 1.1224 | 0.1072 | 1.77250 | 49.60 |
| 22 | −0.6230 | 0.1376 | | |
| 23 | −0.5170 | 0.0267 | 1.53172 | 48.84 |
| 24 | 0.4947 | 0.1423 | 1.49700 | 81.54 |
| 25 | −0.8777 | DD[25] | | |
| 26 | 1.2205 | 0.0699 | 1.77250 | 49.60 |
| 27 | −15.5847 | 0.2592 | | |
| 28 | ∞ | 0.4210 | 1.51633 | 64.14 |
| 29 | ∞ | | | |

TABLE 7-continued

| | Wide Angle | Intermediate | Telephoto |
|---|---|---|---|
| (B) Example 7: Items (d line) | | | |
| Zoom Ratio | 1.000 | 1.304 | 1.700 |
| f | 1.000 | 1.304 | 1.700 |
| Bf | 0.537 | 0.537 | 0.537 |
| FNo. | 2.20 | 2.52 | 2.87 |
| 2ω[°] | 24.6 | 18.8 | 14.4 |
| (C) Example 7: Zoom Distances | | | |
| DD[9] | 0.5502 | 0.2695 | 0.0202 |
| DD[14] | 0.0859 | 0.0921 | 0.3829 |
| DD[16] | 0.0403 | 0.1130 | 0.2516 |
| DD[18] | 0.1581 | 0.2637 | 0.1897 |
| DD[25] | 0.1729 | 0.2691 | 0.1629 |

EXAMPLE 8

FIG. 8 illustrates the configurations of lens groups and the trajectories of rays of light through a projection zoom lens of Example 8 at the wide angle end, the intermediate focal length state, and the telephoto end. The signs of the refractive powers of each of a first lens group G1 through a sixth lens group G6, the lens groups that remain fixed when changing magnification, and the lens groups that move when changing magnification of the projection zoom lens of Example 8 are approximately the same as those of the projection zoom lens of Example 1.

The signs of the refractive powers of each of the lens groups and the configurations of the shapes of the lenses of the projection zoom lens of Example 8 are approximately the same as those of the projection zoom lens of Example 7. However, the projection zoom lens of Example 8 differs from the projection zoom lens of Example 7 in that the first lens group G1 is constituted by a first lens L1, which is a plano convex lens having a planar surface toward the reduction side, a second lens L2, which is a negative meniscus lens having a concave surface toward the reduction side, a third lens L3, which is a positive meniscus lens having a concave surface toward the magnification side, a fourth lens L4, which is a biconcave lens, and a fifth lens L5, which is a plano convex lens having a planar surface toward the reduction side, in this order from the magnification side.

Basic lens data, items related to the d line, and zoom distances of the projection zoom lens of Example 4 are shown in (A) through (C) of Table 8. DD[9], DD[14], DD[16], DD[18], and DD[25] are respectively shown in the column of distances, for distances between surfaces that move when changing magnification in (A) of Table 8, and the values corresponding thereto are shown in (C) of Table 8. A through L of FIG. 20 illustrate various aberrations of the projection zoom lens of Example 8.

TABLE 8

(A) Example 8: Lens Data

| Si | Ri | Di | Ndj | vdj |
|---|---|---|---|---|
| 1 | 1.9343 | 0.0929 | 1.72342 | 37.95 |
| 2 | ∞ | 0.3878 | | |
| 3 | 10.0481 | 0.0357 | 1.51633 | 64.14 |
| 4 | 0.6784 | 0.0732 | | |
| 5 | −2.9313 | 0.0532 | 1.63854 | 55.38 |
| 6 | −1.3293 | 0.0794 | | |
| 7 | −0.8714 | 0.0359 | 1.65412 | 39.68 |
| 8 | 0.9599 | 0.0715 | 1.72825 | 28.46 |

TABLE 8-continued

| | | | | |
|---|---|---|---|---|
| 9 | ∞ | DD[9] | | |
| 10 | 1.5323 | 0.0288 | 1.74000 | 28.30 |
| 11 | 0.6099 | 0.1082 | 1.49700 | 81.54 |
| 12 | −4.1877 | 0.0028 | | |
| 13 | 0.8022 | 0.1036 | 1.69680 | 55.53 |
| 14 | −3.1732 | DD[14] | | |
| 15 | 0.7869 | 0.0572 | 1.53172 | 48.84 |
| 16 | 0.4302 | DD[16] | | |
| 17 | 0.4209 | 0.1141 | 1.62041 | 60.29 |
| 18 | 0.4944 | DD[18] | | |
| 19 | −0.5303 | 0.0243 | 1.65844 | 50.88 |
| 20 | 0.6895 | 0.0698 | | |
| 21 | 0.9790 | 0.1066 | 1.71700 | 47.92 |
| 22 | −0.5320 | 0.1984 | | |
| 23 | −0.4168 | 0.0273 | 1.53172 | 48.84 |
| 24 | 0.4867 | 0.2098 | 1.49700 | 81.54 |
| 25 | −0.7239 | DD[25] | | |
| 26 | 1.2051 | 0.0821 | 1.77250 | 49.60 |
| 27 | −3.7984 | 0.2966 | | |
| 28 | ∞ | 0.4286 | 1.51633 | 64.14 |
| 29 | ∞ | | | |

| | Wide Angle | Intermediate | Telephoto |
|---|---|---|---|
| (B) Example 8: Items (d line) | | | |
| Zoom Ratio | 1.000 | 1.304 | 1.700 |
| f | 1.000 | 1.304 | 1.700 |
| Bf | 0.579 | 0.579 | 0.579 |
| FNo. | 2.20 | 2.53 | 2.86 |
| 2ω[°] | 25.1 | 19.2 | 14.7 |
| (C) Example 8: Zoom Distances | | | |
| DD[9] | 0.5397 | 0.2688 | 0.0234 |
| DD[14] | 0.0742 | 0.0902 | 0.1961 |
| DD[16] | 0.0438 | 0.1092 | 0.2644 |
| DD[18] | 0.1426 | 0.2056 | 0.2367 |
| DD[25] | 0.0221 | 0.1486 | 0.1017 |

EXAMPLE 9

FIG. 9 illustrates the configurations of lens groups and the trajectories of rays of light through a projection zoom lens of Example 9 at the wide angle end, the intermediate focal length state, and the telephoto end. The signs of the refractive powers of each of a first lens group G1 through a sixth lens group G6, the lens groups that remain fixed when changing magnification, and the lens groups that move when changing magnification are the same as those of the projection zoom lens of Example 1. However, the lens configurations of each of the lens groups differ from those of Example 1, as will be described below.

The first lens group G1 is constituted by a first lens L1, which is a positive meniscus lens having a concave surface toward the reduction side, a second lens L2, which is a negative meniscus lens having a concave surface toward the reduction side, and a third lens L3, which is a biconcave lens, in this order from the magnification side.

The second lens group G2 is constituted by a fourth lens L4, which is a plano convex lens having a planar surface toward the magnification side, a fifth lens L5, which is a biconvex lens, and a sixth lens L6, which is a biconvex lens, in this order from the magnification side. The fourth lens L4 and the fifth lens L5 are cemented together.

The third lens group L3 is constituted by a seventh lens L7, which is a negative meniscus lens having a concave surface toward the magnification side, and an eighth lens L8, which is a biconvex lens, in this order from the magnification side. The fourth lens group G4 is constituted only by a ninth lens L9, which is a biconvex lens.

The fifth lens group G5 is constituted by a tenth lens L10, which is a biconvex lens, an eleventh lens Lii, which is a biconcave lens, a twelfth lens L12, which is a biconcave lens, and a thirteenth lens L13, which is a biconvex lens, in this order from the magnification side. The sixth lens group G6 is constituted only by a fourteenth lens L14, which is a biconvex lens.

Basic lens data, items related to the d line, and zoom distances of the projection zoom lens of Example 9 are shown in (A) through (C) of Table 9. DD[6], DD[11], DD[15], DD[17], and DD[23] are respectively shown in the column of distances, for distances between surfaces that move when changing magnification in (A) of Table 9, and the values corresponding thereto are shown in (C) of Table 9. A through L of FIG. 21 illustrate various aberrations of the projection zoom lens of Example 9.

TABLE 9

| (A) Example 9: Lens Data | | | | |
|---|---|---|---|---|
| Si | Ri | Di | Ndj | vdj |
| 1 | 1.2400 | 0.1351 | 1.80610 | 33.27 |
| 2 | 10.9570 | 0.3698 | | |
| 3 | 6.9015 | 0.0298 | 1.77250 | 49.60 |
| 4 | 0.7109 | 0.0767 | | |
| 5 | −1.2524 | 0.0388 | 1.72342 | 37.95 |
| 6 | 5.8022 | DD[6] | | |
| 7 | ∞ | 0.0426 | 1.60342 | 38.03 |
| 8 | 0.6065 | 0.1239 | 1.61800 | 63.33 |
| 9 | −1.2497 | 0.0028 | | |
| 10 | 1.8075 | 0.0603 | 1.69680 | 55.53 |
| 11 | −3.8580 | DD[11] | | |
| 12 | −0.8744 | 0.0299 | 1.60342 | 38.03 |
| 13 | −20.8010 | 0.0383 | | |
| 14 | 2.4173 | 0.0626 | 1.62041 | 60.29 |
| 15 | −2.4173 | DD[15] | | |
| 16 | 1.0715 | 0.0610 | 1.49700 | 81.54 |
| 17 | −2.5246 | DD[17] | | |
| 18 | 1.5341 | 0.0854 | 1.80000 | 29.84 |
| 19 | −0.6905 | 0.0427 | 1.53172 | 48.84 |
| 20 | 0.4145 | 0.1390 | | |
| 21 | −0.3742 | 0.0285 | 1.74000 | 28.30 |
| 22 | 0.6129 | 0.1553 | 1.62299 | 58.16 |
| 23 | −0.5052 | DD[23] | | |
| 24 | 0.8528 | 0.0865 | 1.80518 | 25.42 |
| 25 | −9.3214 | 0.2907 | | |
| 26 | ∞ | 0.4269 | 1.51680 | 64.20 |
| 27 | ∞ | | | |

| | Wide Angle | Intermediate | Telephoto |
|---|---|---|---|
| (B) Example 9: Items (d line) | | | |
| Zoom Ratio | 1.000 | 1.304 | 1.700 |
| f | 1.000 | 1.304 | 1.700 |
| Bf | 0.572 | 0.572 | 0.572 |
| FNo. | 2.21 | 2.46 | 2.83 |
| 2ω[°] | 24.9 | 19.0 | 14.6 |
| (C) Example 9: Zoom Distances | | | |
| DD[6] | 0.5726 | 0.3167 | 0.0770 |
| DD[11] | 0.0998 | 0.2352 | 0.3502 |
| DD[15] | 0.3747 | 0.3924 | 0.2866 |
| DD[17] | 0.0244 | 0.0922 | 0.2503 |
| DD[23] | 0.1278 | 0.1629 | 0.2352 |

EXAMPLE 10

FIG. 10 illustrates the configurations of lens groups and the trajectories of rays of light through a projection zoom lens of Example 10 at the wide angle end, the intermediate focal length state, and the telephoto end. The projection zoom lens of Example 10 has approximately the same configuration as the projection zoom lens of Example 1, except that a fourth lens L4 is a biconcave lens, that a sixth lens L6 is a positive meniscus lens having a concave surface toward the reduction side, that an eighth lens L8 is a positive meniscus lens having a concave surface toward the magnification side, that a seventh lens L7 and the eighth lens L8 are cemented together, and that a tenth lens L10 and an eleventh lens L11 are not cemented together.

Basic lens data, items related to the d line, and zoom distances of the projection zoom lens of Example 10 are shown in (A) through (C) of Table 10. DD[6], DD[11], DD[14], DD[16], and DD[23] are respectively shown in the column of distances, for distances between surfaces that move when changing magnification in (A) of Table 10, and the values corresponding thereto are shown in (C) of Table 10. A through L of FIG. 22 illustrate various aberrations of the projection zoom lens of Example 10.

TABLE 10

(A) Example 10: Lens Data

| Si | Ri | Di | Ndj | vdj |
|---|---|---|---|---|
| 1 | 0.8593 | 0.1359 | 1.80610 | 33.27 |
| 2 | 8.1692 | 0.1591 | | |
| 3 | 5.9126 | 0.0429 | 1.65844 | 50.88 |
| 4 | 0.5848 | 0.0922 | | |
| 5 | −1.2483 | 0.0257 | 1.72342 | 37.95 |
| 6 | 1.9907 | DD[6] | | |
| 7 | −2.8820 | 0.0319 | 1.60342 | 38.03 |
| 8 | 0.6790 | 0.1336 | 1.61800 | 63.33 |
| 9 | −0.8973 | 0.0028 | | |
| 10 | 1.0606 | 0.0650 | 1.71300 | 53.87 |
| 11 | 6.0130 | DD[11] | | |
| 12 | −0.8459 | 0.0268 | 1.72342 | 37.95 |
| 13 | −8.2695 | 0.0723 | 1.49700 | 81.54 |
| 14 | −1.0391 | DD[14] | | |
| 15 | 1.2046 | 0.0628 | 1.48749 | 70.23 |
| 16 | −2.7628 | DD[16] | | |
| 17 | 1.0533 | 0.0783 | 1.80000 | 29.84 |
| 18 | −1.9106 | 0.0730 | | |
| 19 | −1.8814 | 0.0234 | 1.51742 | 52.43 |
| 20 | 0.4377 | 0.1042 | | |
| 21 | −0.4175 | 0.0194 | 1.75520 | 27.51 |
| 22 | 0.7492 | 0.1574 | 1.62041 | 60.29 |
| 23 | −0.5433 | DD[23] | | |
| 24 | 1.3144 | 0.0980 | 1.74000 | 28.30 |
| 25 | −1.6688 | 0.2821 | | |
| 26 | ∞ | 0.4296 | 1.51680 | 64.20 |
| 27 | ∞ | | | |

| | Wide Angle | Intermediate | Telephoto |
|---|---|---|---|
| (B) Example 10: Items (d line) | | | |
| Zoom Ratio | 1.000 | 1.304 | 1.700 |
| f | 1.000 | 1.304 | 1.700 |
| Bf | 0.565 | 0.565 | 0.565 |
| FNo. | 2.20 | 2.46 | 2.95 |
| 2ω[°] | 25.1 | 19.1 | 14.7 |
| (C) Example 10: Zoom Distances | | | |
| DD[6] | 0.5628 | 0.3013 | 0.0877 |
| DD[11] | 0.1018 | 0.1937 | 0.2291 |
| DD[14] | 0.5401 | 0.5203 | 0.3564 |
| DD[16] | 0.0209 | 0.1590 | 0.3857 |
| DD[23] | 0.1283 | 0.1796 | 0.2950 |

EXAMPLE 11

FIG. 11 illustrates the configurations of lens groups and the trajectories of rays of light through a projection zoom lens of Example 11 at the wide angle end, the intermediate focal length state, and the telephoto end. The projection zoom lens of Example 11 has approximately the same configuration as the projection zoom lens of Example 9, except that a fourth lens L4 is a biconcave lens, that an eighth lens L8 is a positive meniscus lens having a concave surface toward the magnification side, and that a seventh lens L7 and the eighth lens L8 are cemented together.

Basic lens data, items related to the d line, and zoom distances of the projection zoom lens of Example 11 are shown in (A) through (C) of Table 11. DD[6], DD[11], DD[14], DD[16], and DD[22] are respectively shown in the column of distances, for distances between surfaces that move when changing magnification in (A) of Table 11, and the values corresponding thereto are shown in (C) of Table 11. A through L of FIG. 23 illustrate various aberrations of the projection zoom lens of Example 11.

TABLE 11

(A) Example 11: Lens Data

| Si | Ri | Di | Ndj | vdj |
|---|---|---|---|---|
| 1 | 1.0496 | 0.1357 | 1.80610 | 33.27 |
| 2 | 41.1193 | 0.1747 | | |
| 3 | 7.2721 | 0.0429 | 1.65844 | 50.88 |
| 4 | 0.7193 | 0.0857 | | |
| 5 | −1.3534 | 0.0257 | 1.72342 | 37.95 |
| 6 | 1.9501 | DD[6] | | |
| 7 | −9.1459 | 0.0334 | 1.60342 | 38.03 |
| 8 | 0.6413 | 0.1868 | 1.61800 | 63.33 |
| 9 | −1.1448 | 0.0028 | | |
| 10 | 1.3607 | 0.0658 | 1.69680 | 55.53 |
| 11 | −28.5952 | DD[11] | | |
| 12 | −1.0200 | 0.0258 | 1.72342 | 37.95 |
| 13 | −2.9413 | 0.0557 | 1.49700 | 81.54 |
| 14 | −1.4262 | DD[14] | | |
| 15 | 0.8889 | 0.1143 | 1.49700 | 81.54 |
| 16 | −9.3303 | DD[16] | | |
| 17 | 1.1465 | 0.0858 | 1.80000 | 29.84 |
| 18 | −0.6821 | 0.0571 | 1.53172 | 48.84 |
| 19 | 0.3993 | 0.1308 | | |
| 20 | −0.3629 | 0.0192 | 1.75520 | 27.51 |
| 21 | 0.6311 | 0.1571 | 1.62041 | 60.29 |
| 22 | −0.4730 | DD[22] | | |
| 23 | 0.9027 | 0.1000 | 1.74000 | 28.30 |
| 24 | −3.6047 | 0.2861 | | |
| 25 | ∞ | 0.4289 | 1.51680 | 64.20 |
| 26 | ∞ | | | |

| | Wide Angle | Intermediate | Telephoto |
|---|---|---|---|
| (B) Example 11: Items (d line) | | | |
| Zoom Ratio | 1.000 | 1.304 | 1.700 |
| f | 1.000 | 1.304 | 1.700 |
| Bf | 0.569 | 0.569 | 0.569 |
| FNo. | 2.20 | 2.44 | 2.82 |
| 2ω[°] | 25.0 | 19.1 | 14.7 |
| (C) Example 11: Zoom Distances | | | |
| DD[6] | 0.5857 | 0.3149 | 0.0801 |
| DD[11] | 0.0847 | 0.2231 | 0.3392 |
| DD[14] | 0.4240 | 0.4430 | 0.2924 |
| DD[16] | 0.0653 | 0.1327 | 0.2768 |
| DD[22] | 0.1267 | 0.1727 | 0.2980 |

Table 12 shows values corresponding to each of Conditional Formulae (1), (2), (3A), (3B), (3C), (4A), (4B), (4C), and (5) through (10) for each of Examples 1 through 11 and other various values. Note that in Table 12, f1 denotes the focal length of the first lens group G1, f3 denotes the focal length of the third lens group, f4 denotes the focal length of the fourth lens group G4, BrG4 denotes the amount of displacement of the fourth lens group G4 between the wide angle end and the telephoto end, and BrG5 denotes the amount of displacement of the fifth lens group G5 between the wide angle end and the telephoto end.

TABLE 12

| Conditional Formula | | Example 1 | Example 2 | Example 3 | Example 4 | Example 5 | Example 6 | Example 7 | Example 8 | Example 9 | Example 10 | Example 11 |
|---|---|---|---|---|---|---|---|---|---|---|---|---|
| (1) | fw/f5 | −0.75 | −0.70 | −0.69 | −0.63 | −0.19 | −0.21 | 0.04 | −0.31 | −0.92 | −0.62 | −0.76 |
| (2) | Bf/fw × Zr | 1.28 | 1.31 | 1.28 | 1.28 | 0.74 | 0.92 | 0.91 | 0.98 | 0.97 | 0.96 | 0.97 |
| (3A) | fF46w/fw | −0.52 | −0.48 | −0.45 | −0.48 | −0.25 | −0.45 | −0.30 | −0.28 | −0.58 | −0.62 | −0.54 |
| (3B) | fF46m/fw | −0.37 | −0.31 | −0.30 | −0.35 | −0.13 | −0.29 | −0.12 | −0.10 | −0.50 | −0.49 | −0.44 |
| (3C) | fF46t/fw | −0.43 | −0.35 | −0.37 | −0.39 | −0.05 | −0.09 | −0.27 | −0.11 | −0.29 | −0.14 | −0.13 |
| (4A) | Imφ/f56w | 0.20 | 0.22 | 0.23 | 0.23 | 0.33 | 0.38 | 0.38 | 0.38 | 0.22 | 0.24 | 0.25 |
| (4B) | Imφ/f56m | 0.25 | 0.27 | 0.27 | 0.27 | 0.35 | 0.39 | 0.38 | 0.39 | 0.24 | 0.25 | 0.26 |
| (4C) | Imφ/f56t | 0.22 | 0.24 | 0.24 | 0.24 | 0.37 | 0.37 | 0.38 | 0.39 | 0.27 | 0.28 | 0.30 |
| (5) | Bf/Imφ | 1.30 | 1.32 | 1.30 | 1.30 | 1.13 | 1.26 | 1.24 | 1.32 | 1.31 | 1.28 | 1.29 |
| (6) | BrG2/Brmx | 1.89 | 1.67 | 1.93 | 1.83 | 0.85 | 0.91 | 2.28 | 1.31 | 1.49 | 0.89 | 1.32 |
| (7) | 2ωt | 19.3 | 19.3 | 19.3 | 19.3 | 13.0 | 14.3 | 14.4 | 14.7 | 14.6 | 14.7 | 14.7 |
| (8) | Zr | 1.700 | 1.700 | 1.700 | 1.700 | 1.700 | 1.700 | 1.700 | 1.700 | 1.700 | 1.700 | 1.700 |
| (9) | f2/fw | 1.018 | 0.970 | 0.976 | 1.070 | 0.606 | 0.922 | 0.891 | 0.792 | 0.929 | 0.923 | 0.963 |
| (10) | f6/fw | 1.312 | 1.275 | 1.303 | 1.334 | 1.183 | 1.220 | 1.468 | 1.193 | 0.974 | 1.008 | 0.985 |

| | Example 1 | Example 2 | Example 3 | Example 4 | Example 5 | Example 6 | Example 7 | Example 8 | Example 9 | Example 10 | Example 11 |
|---|---|---|---|---|---|---|---|---|---|---|---|
| f1 | −1.315 | −1.322 | −1.310 | −1.439 | −1.626 | −2.095 | −1.845 | −1.796 | −1.553 | −1.526 | −1.640 |
| f2 | 1.018 | 0.970 | 0.976 | 1.070 | 0.606 | 0.922 | 0.891 | 0.792 | 0.929 | 0.923 | 0.963 |
| f3 | −1.165 | −1.187 | −1.144 | −1.251 | −1.201 | −2.010 | −2.304 | −1.890 | −8.072 | −3.089 | −3.689 |
| f4 | 0.936 | 1.034 | 0.969 | 0.950 | 2.511 | 2.458 | 3.421 | 2.861 | 1.522 | 1.730 | 1.639 |
| f5 | −1.338 | −1.426 | −1.458 | −1.585 | −5.244 | −4.834 | 27.229 | −3.203 | −1.091 | −1.601 | −1.309 |
| f6 | 1.312 | 1.275 | 1.303 | 1.334 | 1.183 | 1.220 | 1.468 | 1.193 | 0.974 | 1.008 | 0.985 |
| BrG2 | 0.539 | 0.535 | 0.521 | 0.555 | 0.471 | 0.564 | 0.530 | 0.516 | 0.496 | 0.475 | 0.506 |
| BrG3 | 0.077 | 0.137 | 0.077 | 0.132 | 0.329 | 0.619 | 0.233 | 0.394 | 0.245 | 0.348 | 0.251 |
| BrG4 | 0.285 | 0.320 | 0.270 | 0.303 | 0.379 | 0.336 | 0.022 | 0.174 | 0.333 | 0.532 | 0.383 |
| BrG5 | 0.061 | 0.064 | 0.018 | 0.054 | 0.551 | −0.031 | −0.010 | 0.080 | 0.107 | 0.167 | 0.171 |
| fw | 1.000 | 1.000 | 1.000 | 1.000 | 1.000 | 1.000 | 1.000 | 1.000 | 1.000 | 1.000 | 1.000 |
| ft | 1.700 | 1.700 | 1.700 | 1.700 | 1.700 | 1.700 | 1.700 | 1.700 | 1.700 | 1.700 | 1.700 |
| Bf | 0.756 | 0.768 | 0.753 | 0.753 | 0.435 | 0.540 | 0.537 | 0.579 | 0.572 | 0.565 | 0.569 |
| Imφ | 0.581 | 0.580 | 0.580 | 0.579 | 0.386 | 0.429 | 0.432 | 0.440 | 0.438 | 0.441 | 0.440 |
| f56w | 2.977 | 2.618 | 2.520 | 2.556 | 1.159 | 1.141 | 1.134 | 1.163 | 1.958 | 1.852 | 1.792 |
| f56m | 2.352 | 2.135 | 2.118 | 2.146 | 1.108 | 1.108 | 1.137 | 1.120 | 1.839 | 1.749 | 1.684 |
| f56t | 2.699 | 2.396 | 2.462 | 2.400 | 1.051 | 1.148 | 1.133 | 1.135 | 1.634 | 1.555 | 1.447 |
| fF46w | −0.520 | −0.480 | −0.445 | −0.482 | −0.248 | −0.448 | −0.296 | −0.284 | −0.579 | −0.623 | −0.538 |
| fF46m | −0.372 | −0.308 | −0.299 | −0.354 | −0.131 | −0.286 | −0.120 | −0.097 | −0.497 | −0.487 | −0.436 |
| fF46t | −0.427 | −0.353 | −0.371 | −0.392 | −0.054 | −0.087 | −0.270 | −0.109 | −0.290 | −0.140 | −0.128 |

Embodiments and Examples of the present invention have been described above. However, the projection zoom lens of the present invention is not limited to the Examples described above, and various modifications to the aspects of the projection zoom lens are possible. For example, the radii of curvature, the distances among surfaces, the refractive indices, and the Abbe's numbers of the lenses may be changed as appropriate.

In addition, the projection display device of the present invention is not limited to that having the configuration described above, and various modifications to the aspects of the projection display device are possible. For example, the light valves which are employed and the optical members which are employed to separate and combine light beams are not limited to those of the configuration described above.

What is claimed is:

1. A projection zoom lens, substantially consisting of six lens groups, including:
a first lens group having a negative refractive power, which is fixed when changing magnification;
second, third, fourth, and fifth lens groups that move when changing magnification; and
a sixth lens group having a positive refractive power, which is fixed when changing magnification, provided in this order from a magnification side;
the reduction side being telecentric;
the second lens group being configured to move toward the magnification side when changing magnification from a wide angle end to a telephoto end;
the first and second lenses from a reduction side of the fifth lens group being a positive lens and a negative lens, respectively;
the sixth lens group being a single positive lens; and
the projection zoom lens satisfying Conditional Formula (1) below:

$$-2.0 < fw/f5 < 0.1 \tag{1}$$

wherein fw is the focal length of the entire system at the wide angle end, and f5 is the focal length of the fifth lens group.

2. A projection zoom lens as defined in claim 1, that satisfies Conditional Formulae (3A), (3B), and (3C) below:

$$fF46w/fw < 0.0 \tag{3A}$$

$$fF46m/fw < 0.0 \tag{3B}$$

$$fF46t/fw < 0.0 \tag{3C}$$

wherein fF46w is the combined front focus of the fourth lens group, the fifth lens group, and the sixth lens group at the wide angle end, fF46m is the combined front focus of the fourth lens group, the fifth lens group, and the sixth lens group in a midpoint focal length state (a state in which the focal length of the entire system is $(fw \cdot ft)^{1/2}$ when the focal length of the entire system at the wide angle end is designated as fw and the focal length of the entire system at the telephoto end is designated as ft), and fF46t is the combined front focus of the fourth lens group, the fifth lens group, and the sixth lens group at the telephoto end.

3. A projection zoom lens as defined in claim 1, that satisfies Conditional Formulae (4A), (4B), and (4C) below:

$$0.0 < Im\phi/f56w < 0.5 \quad (4A)$$

$$0.0 < Im\phi/f56m < 0.5 \quad (4B)$$

$$0.0 < Im\phi/f56t < 0.5 \quad (4C)$$

wherein Imφ is the maximum effective image diameter at the reduction side, f56w is the combined focal length of the fifth lens group and the sixth lens group at the wide angle end, f56m is the combined focal length of the fifth lens group and the sixth lens group in a midpoint focal length state (a state in which the focal length of the entire system is $(fw \cdot ft)^{1/2}$ when the focal length of the entire system at the wide angle end is designated as fw and the focal length of the entire system at the telephoto end is designated as ft), and f56t is the combined focal length of the fifth lens group and the sixth lens group at the telephoto end.

4. A projection zoom lens as defined in claim 1 that satisfies Conditional Formula (5) below:

$$1.0 < Bf/Im\phi \quad (5)$$

wherein Bf is the back focus of the entire system (air converted distance), and Imφ is the maximum effective image diameter at the reduction side.

5. A projection zoom lens as defined in claim 1 that satisfies Conditional Formula (6) below:

$$0.7 < BrG2/Brmx < 3.5 \quad (6)$$

wherein BrG2 is the amount of displacement of the second lens group from the wide angle end to the telephoto end, and Brmx is the maximum value from among the amount of displacement of the third lens group from the wide angle end to the telephoto end, the amount of displacement of the fourth lens group from the wide angle end to the telephoto end, and the amount of displacement of the fifth lens group from the wide angle end to the telephoto end.

6. A projection zoom lens as defined in claim 1 that satisfies Conditional Formula (7) below:

$$2\omega t < 25 \quad (7)$$

wherein 2ωt is the maximum full angle of view at the telephoto end.

7. A projection zoom lens as defined in claim 1 that satisfies Conditional Formula (8) below:

$$1.5 < Zr \quad (8)$$

wherein Zr is a zoom ratio.

8. A projection zoom lens as defined in claim 1 that satisfies Conditional Formula (1') below:

$$-2.0 < fw/f5 < 0.0 \quad (1')$$

wherein f5 is the focal length of the fifth lens group.

9. A projection zoom lens as defined in claim 1 that satisfies Conditional Formula (2') below:

$$0.7 < Bf/fw \cdot Zr < 2.0 \quad (2')$$

wherein Bf is the back focus (air converted distance) of the entire system, and Zr is a zoom ratio.

10. A projection zoom lens as defined in claim 1 that satisfies Conditional Formulae (3A'), (3B'), and (3C') below:

$$-2.5 < fF46w/fw < 0.0 \quad (3A')$$

$$-2.5 < fF46m/fw < 0.0 \quad (3B')$$

$$-2.5 < fF46t/fw < 0.0 \quad (3C')$$

wherein fF46w is the combined front focus of the fourth lens group, the fifth lens group, and the sixth lens group at the wide angle end, fF46m is the combined front focus of the fourth lens group, the fifth lens group, and the sixth lens group in a midpoint focal length state (a state in which the focal length of the entire system is $(fw \cdot ft)^{1/2}$ when the focal length of the entire system at the wide angle end is designated as fw and the focal length of the entire system at the telephoto end is designated as ft), and fF46t is the combined front focus of the fourth lens group, the fifth lens group, and the sixth lens group at the telephoto end.

11. A projection zoom lens as defined in claim 1 that satisfies Conditional Formulae (4A'), (4B'), and (4C') below:

$$0.1 < Im\phi/f56w < 0.5 \quad (4A')$$

$$0.1 < Im\phi/f56m < 0.5 \quad (4B')$$

$$0.1 < Im\phi/f56t < 0.5 \quad (4C')$$

wherein Imφ is the maximum effective image diameter at the reduction side, f56w is the combined focal length of the fifth lens group and the sixth lens group at the wide angle end, f56m is the combined focal length of the fifth lens group and the sixth lens group in a midpoint focal length state (a state in which the focal length of the entire system is $(fw \cdot ft)^{1/2}$ when the focal length of the entire system at the wide angle end is designated as fw and the focal length of the entire system at the telephoto end is designated as ft), and f56t is the combined focal length of the fifth lens group and the sixth lens group at the telephoto end.

12. A projection zoom lens as defined in claim 1 that satisfies Conditional Formula (6') below:

$$0.8 < BrG2/Brmx < 2.5 \quad (6')$$

wherein BrG2 is the amount of displacement of the second lens group from the wide angle end to the telephoto end, and Brmx is the maximum value from among the amount of displacement of the third lens group from the wide angle end to the telephoto end, the amount of displacement of the fourth lens group from the wide angle end to the telephoto end, and the amount of displacement of the fifth lens group from the wide angle end to the telephoto end.

13. A projection zoom lens as defined in claim 1 that satisfies Conditional Formula (7') below:

$$2\omega t < 20 \quad (7')$$

wherein 2ωt is the maximum full angle of view at the telephoto end.

14. A projection zoom lens as defined in claim 1 that satisfies Conditional Formula (8') below:

$$1.5 < Zr < 2.2 \quad (8')$$

wherein Zr is a zoom ratio.

15. A projection type display device, comprising:
a light source;
a light valve, into which light from the light source enters; and a projection zoom lens as defined in claim 1 that projects optical images formed by light modulated by the light valve onto a screen.

16. A projection zoom lens as defined in claim 1, wherein:
the second lens group has a positive refractive power.

17. A projection zoom lens as defined in claim 16, wherein:
the third lens group has a negative refractive power; and
the fourth lens group has a positive refractive power.

18. A projection zoom lens, substantially consisting of six lens groups, including:
a first lens group having a negative refractive power, which is fixed when changing magnification;
second, third, fourth, and fifth lens groups that move when changing magnification; and
a sixth lens group having a positive refractive power, which is fixed when changing magnification, provided in this order from a magnification side;
the reduction side being telecentric;
the second lens group being configured to move toward the magnification side when changing magnification from a wide angle end to a telephoto end;
the lens most toward the magnification side in the entire system being a positive lens;
the first and second lenses from a reduction side of the fifth lens group being a positive lens and a negative lens, respectively;
the sixth lens group being a single positive lens; and
the projection zoom lens satisfying Conditional Formula (2) below:

$$0.7 < Bf/fw \cdot Zr \qquad (2)$$

wherein Bf is the back focus (air converted distance) of the entire system, fw is the focal length of the entire system at the wide angle end, and Zr is a zoom ratio.

19. A projection type display device, comprising:
a light source;
a light valve, into which light from the light source enters; and
a projection zoom lens as defined in claim 2 that projects optical images formed by light modulated by the light valve onto a screen.

\* \* \* \* \*